United States Patent [19]
Nakamura et al.

[11] Patent Number: 5,258,822
[45] Date of Patent: Nov. 2, 1993

[54] SYSTEM FOR DETECTING THE POSITION OF A MOVING BODY

[75] Inventors: Toshikazu Nakamura; Sadachika Tsuzuki; Kazunori Noda; Kenji Kamimura, all of Saitama, Japan

[73] Assignee: Honda Giken Kogyo Kabushiki Kaisha, Tokyo, Japan

[21] Appl. No.: 864,468

[22] Filed: Apr. 6, 1992

[30] Foreign Application Priority Data

Apr. 11, 1991 [JP] Japan ................................. 3-105099
Apr. 15, 1991 [JP] Japan ................................. 3-108337
May 1, 1991 [JP] Japan ..................................... 126515

[51] Int. Cl.$^5$ ............................................. G01B 11/26
[52] U.S. Cl. ................................... 356/141; 356/140; 356/152; 356/1
[58] Field of Search ................... 356/1, 152, 141, 140

[56] References Cited

U.S. PATENT DOCUMENTS

| | | | |
|---|---|---|---|
| 4,010,361 | 3/1977 | Latterman et al. | 240/10 R |
| 4,039,246 | 8/1977 | Voigt | 350/7 |
| 4,795,878 | 1/1989 | Babitsky et al. | 219/121.8 |
| 5,008,557 | 4/1991 | Noji et al. | 356/141 X |
| 5,100,229 | 3/1992 | Lundberg et al. | 356/1 |
| 5,137,354 | 8/1992 | de Vos et al. | 356/152 |

FOREIGN PATENT DOCUMENTS

| | | |
|---|---|---|
| 3614561 | 11/1987 | Fed. Rep. of Germany . |
| 3821892 | 2/1990 | Fed. Rep. of Germany . |
| 1430931 | 10/1988 | U.S.S.R. . |

Primary Examiner—Mark Hellner
Attorney, Agent, or Firm—Pollock, Vande Sande and Priddy

[57] ABSTRACT

A position detection system for a moving body comprising means for rotatively scanning the light beam projected from a light beam generator mounted on the moving body in a substantially horizontal plane, and vibrating to vertically vibrate the rotatively scanned light beam in a cycle two times or more longer than the cycle of the rotative scan. The light beam projected from the moving body and reflected by the retroreflector means provided at at least three positions spaced apart from the moving body is received by a light beam receiver on the moving body, and the position of the moving body is detected on the basis of the directions of the light reception and the known positional information on the retroreflector means.

13 Claims, 23 Drawing Sheets

| STORE NUMBER I | PRECESSION DIRECTION WHEN REFERENCE POINT (n) IS DETECTED As[n, I] | MIRROR ROTATION COUNTER VALUE WHEN REFERENCE POINT (n) IS DETECTED Cm[n, I] |
|---|---|---|
| 1 | 24.1 | 2 |
| 2 | 36.3 | 3 |
| 3 | 108.6 | 9 |
| 4 | 120.7 | 10 |
| 5 | 132.6 | 11 |
| 6 | 144.4 | 12 |

SYSTEM FOR DETECTING THE POSITION OF A MOVING BODY

BACKGROUND OF THE INVENTION

1. Field of the Invention

The present invention is related to a system for detecting the position of a moving body, and particularly to a system for detecting the position of a moving body or moving vehicle such as a mobile machine used for agricultural or civil engineering works, or an automatic transporting apparatus used in a factory.

2. Description of the Prior Art

A previously proposed system for detecting the current position of a moving body as described above comprises means for circularly scanning a light beam generated in a moving body around the moving body, retroreflector means fixed at at least three positions spaced apart from the moving body for reflecting light in the direction of incidence, and light beam receiver means for receiving the light reflected by the retroreflector means (Japanese Patent Application Laid-Open Publication No. 67476/1984).

In this system, the differential azimuths between two of the three retroreflector means as viewed from the moving body are detected on the basis of the outputs of the light beam receiver means. The position of the moving body is calculated based upon the detected azimuths and information (positional information) representing the preset positions of the individual retroreflector means.

In the above-mentioned system, there is a possibility that the moving body or moving vehicle travels while it is inclined or it jolts during the traveling, whereby it cannot apply the light beam emitted from the moving vehicle to retroreflector means and thus the light beam receiver means cannot detect the light reflected by the retroreflector means. Further, the light beam receiving means may receive light from a reflecting object other than predetermined retroreflector means. If the light from the retroreflector means cannot be detected or light from the other object is accidentally detected as the reflected light of the predetermined retroreflector means, then it is possible that the position of the moving vehicle cannot correctly be calculated and the moving vehicle cannot be allowed to travel along a predetermined course.

As a countermeasure therefor, the present applicant proposed a following control system (USP. No. 5031101). In this system, on the basis of the azimuthal data of each retroreflector means with respect to the advance direction of the moving vehicle which has already been detected by the current and previous scans of the light beam, the azimuth in which the same retroreflector means is to be detected in the next scan is predicted. And the light which is incident from the predicted azimuth is determined to be the proper light reflected by the predetermined retroreflector means. If no incidence of light from the predicted direction repetitively occurs, the moving vehicle is stopped.

In addition, the present applicant proposed a control system in which, if no light is incident from a predicted direction, the predicted direction data is used instead of the actual azimuth to perform the position detection of the moving vehicle as a temporary substitute measure, on the basis of a judgment that the predetermined retroreflector means must exist in the vicinity of the predicted azimuth (U.S. Pat. No. 5,187,662).

In this control system, if the missing of a retroreflector means is temporary, the predicted azimuth is deemed to be the true azimuth in which the actual retroreflector means exists, without stopping the moving vehicle, and the predicted azimuth data is used to detect the position of the moving vehicle. As long as the missing of the retroreflector means is temporary, the error between the predicted and actual directions is small, and thus such measure provides no hindrance in practical use. However, retroreflector means can be lost frequently or for a long time depending on the surface condition of the road on which the moving vehicle is traveling, and a new counter measure will be required in such case.

On the other hand, a counter measure before the missing of retroreflector means rather than the above-mentioned one to be taken after the missing of retroreflector means is also considered. For instance, to allow a light beam to successfully be applied to retroreflector means, a light beam scanning apparatus was proposed in which the generated light beam is horizontally scanned while it is vertically vibrated at a high speed (frequency) by a galvano mirror or polygon mirror (Japanese patent application Laid-Open Publication No. 242313/1985).

FIGS. 25A and 25B show scan loci (tracks of light) of a light beam produced by such conventional apparatus. FIG. 25A shows a part of a light track when the light beam is subjected to a vertical vibration scan by a galvano mirror while it is rotatively scanned in the horizontal direction. FIG. 25B shows a part of the light track when the vertical vibration scan of the light beam is performed at a very high speed by a polygon mirror.

The above-mentioned light beam scanning apparatus has the following problems.

In the system wherein the light beam projected from the moving vehicle is also subjected to a vertical vibration scan with a predetermined amplitude using a galvano mirror, so that the light beam can be applied to the retroreflector means with a probability as high as possible even if the moving vehicle travels on the inclined road surface or it jolts, the amplitude of the light track at the retroreflector means becomes larger and the wavelength thereof or the gap between two adjacent light tracks becomes longer as the distance between the moving vehicle and the retroreflector means increases. For this, it may occur that the retroreflector means 6 cannot intersect the light beam track as shown in FIG. 25A, for example.

Also in the system utilizing a polygon mirror, the distance between any two adjacent light tracks at the retroreflector means 6 widens as the distance between the moving vehicle and the retroreflector means 6 increases. For this, it may occur that the retroreflector means 6 and the light beam cannot intersect as shown in FIG. 25B for example. It is required to increase the ratio of the vertical vibration speed to the horizontal scanning speed, or more particularly, to increase the vertical vibration speed and/or decrease the horizontal scanning speed for decreasing the wavelength of the light track or an interval between two adjacent light tracks, so that the light beam will more surely be incident on the light reflector means.

However, increasing the driving speed of the galvano mirror or polygon mirror is very difficult because of mechanical restrictions. If the scan speed in the horizontal direction is decreased, then the number of data received per minute decreases and the position detection precision degrades, and particularly reduction in detection precision is undesirably significant in the use for position detection of a moving body such as a moving vehicle.

Further, in the above described systems, the reflecting surface of the galvano- or polygon mirror relatively inclines with respect to the light beam generator or receiver means. Accordingly, there is a problem that it is required to increase the reflecting surface area of the reflecting mirror at least more than that corresponding to optical axis deviation due to the inclination, and the light beam flux expands accordingly to reduce the intensity of the light beam.

SUMMARY OF THE INVENTION

It is an object of the present invention to provide a system for detecting the position of a moving body wherein the light beam projected from the moving body can be applied to each retroreflector means with a high probability, whereby the position detection accuracy can be enhanced.

It is a further object of the present invention to provide a system for detecting the position of the moving vehicle wherein by improving the arrangement of projecting a light beam from the moving body and receiving the light reflected by each retroreflector means, it is made possible to apply the light beam to each retroreflector means with a high probability and the light projection and reception systems are simplified.

The present invention is characterized by the provision of light beam scanning means for rotatively scanning the light beam projected from light beam generator means mounted on the moving body in a substantially horizontal plane around the moving body, and vibrating means to vertically vibrate the rotatively scanned light beam in a cycle two times or more longer than the cycle of the rotative scan, receiving the light beam projected from the moving body and reflected by the retroreflector means provided at at least three positions spaced apart from the moving body, and detecting the position of the moving body on the basis of the directions of the light reception and known positional information on the retroreflector means.

In the above arrangement, a plurality of rotative scans are performed during one cycle of vibration of the light beam. In consequence, if a cylindrical surface around the moving body is assumed, a mesh of light tracks are drawn by the light beam on the cylindrical surface. That is, in the vicinity of retroreflector means standing upright, two or more rotative scans which are different in vertical height are performed during one vibration cycle. As a result, light tracks cross the retroreflector means with high probability, and the probability of receiving the light beam reflected by the retroreflector means becomes high.

The present invention is also characterized by light beam scanning means for circularly scanning the light beam generated by the light beam generator means carried on the moving body, driving means for causing a precession movement of the rotation axis of the rotatively scanning means in a cycle two times or more longer than the cycle of rotative scan so as to draw a substantially conical loci, and means for generating the light beam and means for receiving the light beam which are disposed so as to be integrally moved with the rotatively scanning means by driving means, and receiving the light beam projected from the moving body and reflected by the retroreflector means provided at fixed positions spaced apart from the moving body, and detecting the position of the moving body of the basis of the position information of the retroreflector means.

In addition, the present invention is characterized in that the light beam scanning means comprises a reflecting mirror for changing an optical axis of the light beam from the light beam generator means, a motor for rotating the reflecting mirror around the optical axis of the light beam from the light beam generator means to the surface of the reflecting mirror, and a precession body caused a precession movement by the driving means, and wherein the reflecting mirror, light beam generator means and receiver means are mounted on the precession body, and the rotation axis of the reflecting mirror is caused to draw a substantially conical surface locus by the movement of the precession body.

In the present invention having the above-mentioned features, when the scanning of light beam is performed in the direction in which the reflecting mirror rotates while the light beam is vertically vibrated, the light beam generator and receiver means are integrally moved and vibrated with the light beam scanning means so that their relative positions remain unchanged. Accordingly, in spite of vertical vibration scanning of the light beam, no displacement occurs in the optical axes of the light beam from the light beam generator means applied to the refecting surface of the reflecting mirror, or of the light reflected by the retroreflector means.

The present invention is further characterized by the provision of means for rotatively scanning the light beam projected from the light beam generator mounted on a moving body in a substantially horizontal plane around the moving body, vertically vibrating the light beam several times during each rotative scan, storing the azimuths of the optical signals received during one cycle of the vertical vibration, predicting the azimuth in which the light reflected by the retroreflector means provided at positions spaced apart from the moving body is to be detected in the next vibration scan, on the basis of the azimuths which have been detected up to the present, comparing the individual stored azimuths with the predictive azimuth to determine the actual light reception azimuth for each one vibration cycle, and detecting the position of the moving body on the basis of the data resulted from the determination.

Even if the light reflected by one reference point may be detected several times when the rotative scan is performed several times during one vibration cycle, the azimuth of each reference point is renewed for each cycle and position detection of the moving body is performed only once per vibration cycle, so that a complex arithmetic operation can be avoided. Accordingly, enough data processing time can be ensured even if the speed of the rotative scan is increased to allow many data to be detected for position detection.

DETAILED DESCRIPTION OF THE PREFERRED EMBODIMENT

Figure 2:
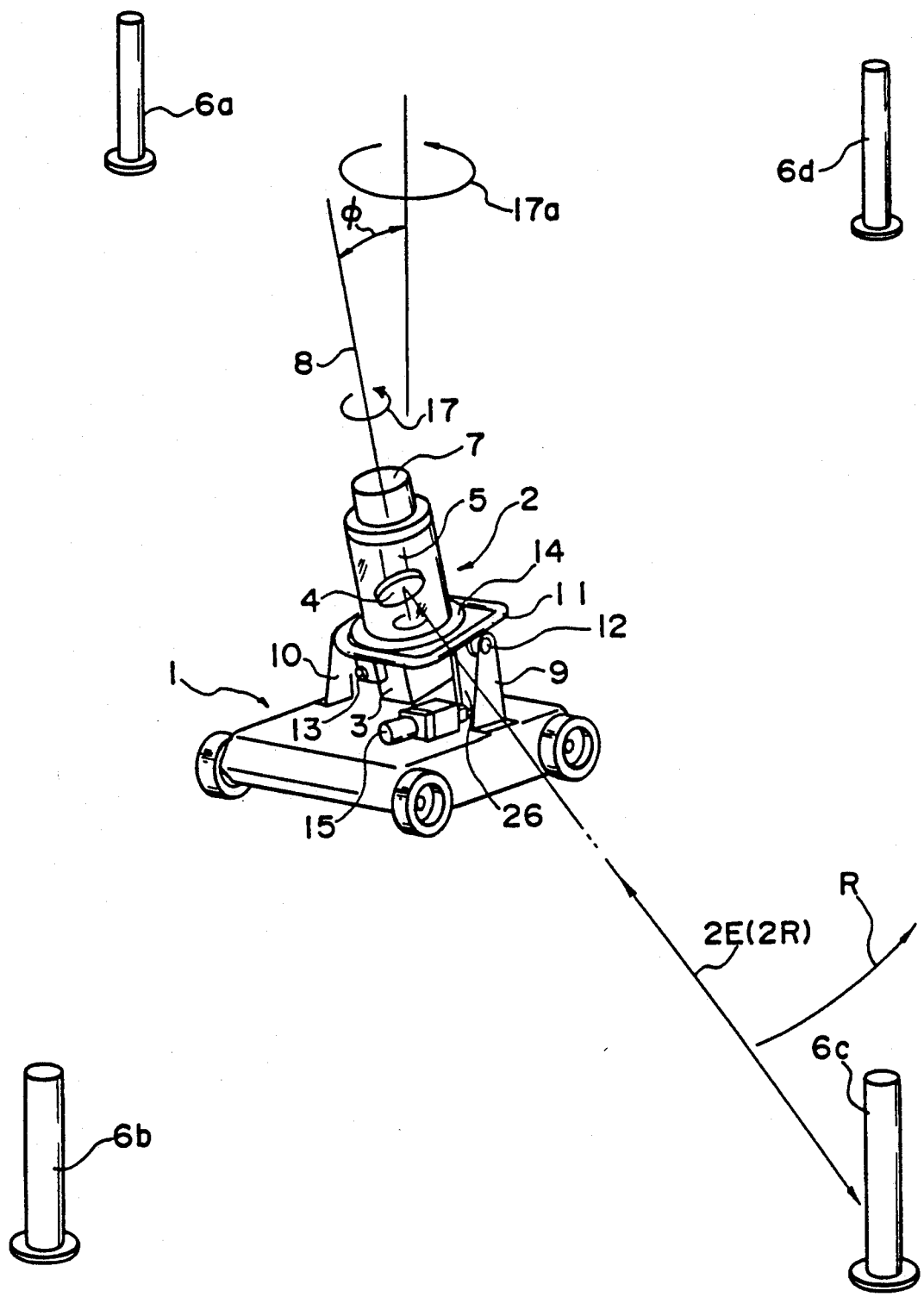
FIG. 2 is a perspective view showing the traveling state of a moving vehicle.

Now an embodiment of the present invention is described with reference to the drawings. FIG. 2 is a perspective view showing a moving vehicle which carries the position detecting system of the present invention and travels in a predetermined area.

In FIG. 2, around the area in which a moving body or a moving vehicle is to travel, optical retroreflectors (hereinafter simply referred to as reflectors) 6a-6d are disposed which have reflecting surfaces for reflecting an incoming light in the direction of its incidence. As the reflecting surface of reflectors 6a-6d, known light reflecting mean such as a corner cube prism is used. The moving vehicle 1 is, for instance, a lawn mower having a cutter blade for lawn mowing (not shown) on the underside of it. On the upper portion of the moving vehicle 1, a light beam scanner (hereinafter simply referred to as scanner) 2 is mounted. The scanner 2 has a light beam generator for generating a light beam 2E and a light beam receiver for detecting the light 2R reflected by each reflector 6a-6d. For instance, the light beam generator has a light emitting diode, and the light beam receiver has a photo diode for converting the incident light to an electric signal. The light beam generator and receiver are contained in a casing 3.

The light beam emanating from the light beam generator is reflected in a rectangulalr direction by a rotating mirror (hereinafter simply referred to as a mirror) 4, whereby it is projected to the outside of the scanner 2. Mirror 4 is rotated by a motor 5 around a central axis of rotation 8 in the direction of an arrow 17, and the light beam 2E is rotatively scanned by the rotation of the mirror 4 around the central axis of rotation 8 in the direction of an arrow R. The projective direction of the light beam 2E depending on the rotational position of the mirror 4, or the rotation angle of the motor 5 is detected by an encoder 7.

The scanner 2 has a gimbal precession mechanism for providing a scanning like a precession to continuously vary the angle of a rotative scanning plane drawn by the light tracks of the light beam 2E. The precession mechanism has an outer ring member 11 journaled for vibration with respect to a shaft 12 of a bracket 9 and a shaft (not shown) of a bracket 10, and an inner ring member 14 provided inside the outer ring 11. The inner ring member 14 is journaled for vibration by shaft 13 provided in the outer ring member 11 on a line perpendicular to a prolonged line of the supporting shaft of the outer ring member 11, and by the other shaft 20 (shown in FIG. 1) provided at the position opposite to the shaft 13.

The gimbal precession mechanism is driven by a motor 15 for vibratory drive. By the gimbal precession mechanism, the central axis of rotation 8 of the mirror 4 is mounted so that it inclines by an angle $\phi$ from a vertical line, and the inclinational direction thereof (hereinafter referred to as precession direction) continuously changes and rotates in the direction of an arrow 17a. The inclination angle of the scanning plane defined by rotative scanning of the light beam 2E continuously changes because of the precession movement or the conical rotation of the central axis of rotation 8. That is, the projective direction of the light beam 2E continuously changes in the upward and downward directions to vertically vibrate the light beam 2E.

Figure 1:
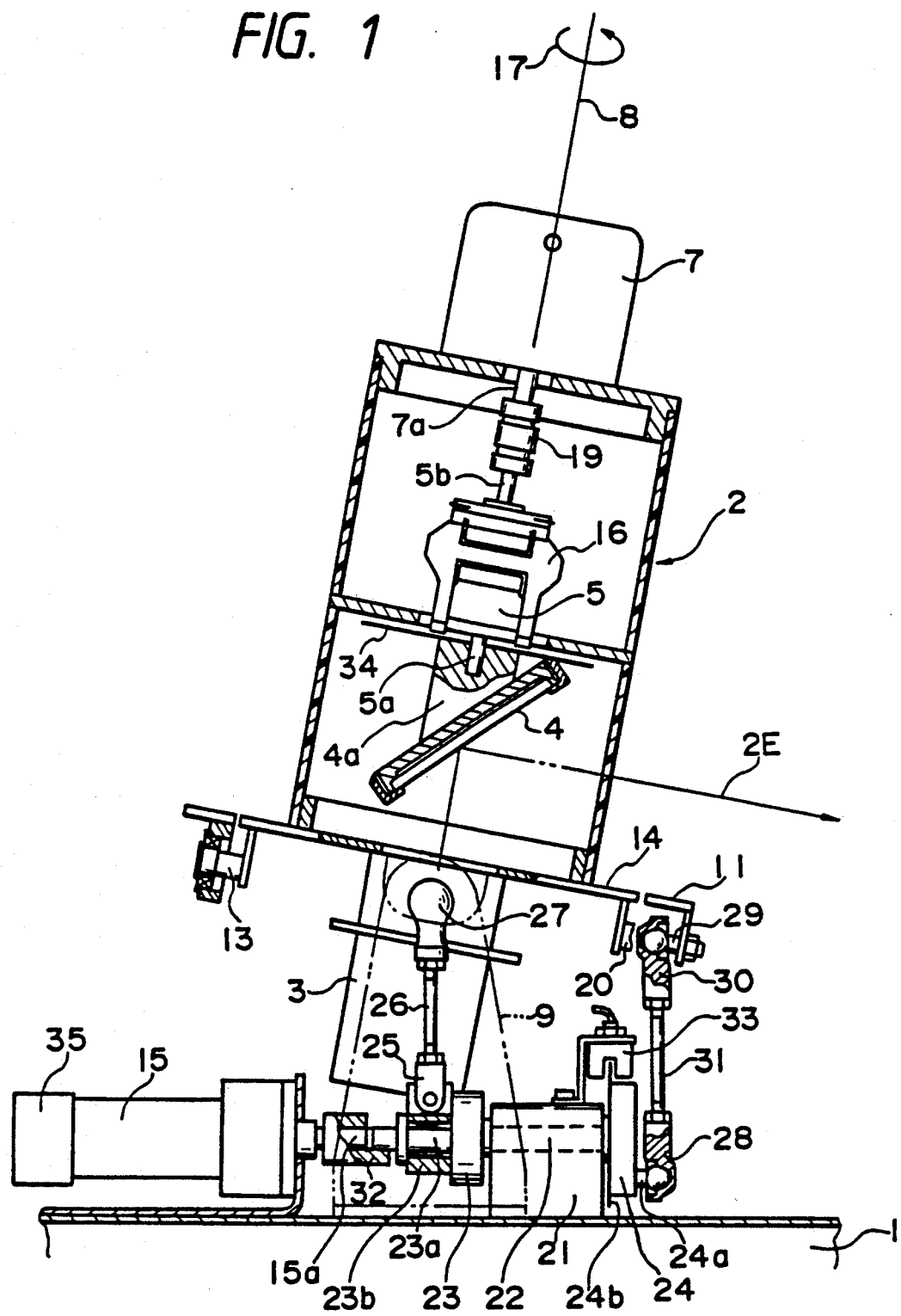
FIG. 1 is a cross-sectional view of the main portion of a light beam scanning apparatus.

The scanner and the drive means of the gimbal precession mechanism are detailed below. FIG. 1 is a cross-sectional view of the main portions of the scanner 2 mounted on the moving vehicle 1, and the same symbols as FIG. 2 represent the same or identical portions.

The mirror 4 is attached to one end 5a of the shaft of the motor 5 through a base 4a. The other end 5b of the shaft of the motor 5 is connected to a shaft 7a of encoder 7 by a connecting fitment 19. The output pulse of encoder 7 is transmitted to a controller, not shown, to be used for the calculation of the rotation angle and the number of revolutions of the mirror 4.

An attracting plate 34 is provided on the base 4a of the mirror 4. The attracting plate 34 is made of a magnetic substance, for instance, iron, and when an electromagnet 16 is energized, plate 34 is attracted by the magnet. As a result, at any time when the electromagnet 16 is energized, the stop position of the mirror 4 is fixed.

The casing 3 is mounted below the inner ring member 14. Although the mounting means of the casing 3 is not shown, well-known fastening means such as bolting may be appropriately used.

Drive means of the gimbal precession mechanism is provided on the upper surface of the moving vehicle 1. A shaft 22 is substantially horizontally inserted through a bearing 21 mounted on the upper surface of the moving vehicle 1, and a small disk 23 is substantially vertically connected with one end of the horizontal shaft 22 and a large disk 24 is substantially vertically connected with the other end thereof. The small disk 23 is provided with a projecting eccentric shaft 23a in an eccentric position with respect to the shaft 22, and the large disk 24 is similarly provided with a projecting eccentric shaft 24a. The eccentric shafts 23a and 24a are substantially parallel with each other, and their directions of eccentricity are shifted by 90 degrees from each other.

The shaft 15a of the motor 15 is aligned with the shaft 22, and a L-shaped block 32 is connected with the shaft 15a. That is, the eccentric shafts 23a and 24a are also eccentric to the shaft 15a by the same amount of eccentricity as that to the shaft 22, and the shaft 15a of the motor 15, eccentric shaft 23a, shaft 22 and eccentric shaft 24a form a crank mechanism. The rotation of shaft 15a by motor 15 is transmitted to the eccentric shaft 23a by block 32 and the shaft 22 rotates. As a result, eccentric shaft 24a also rotates around shaft 22.

An outer contact ring 23b is fitted over the eccentric shaft 23a for rotation, and a block 25 is journaled for vibration on outer contact ring 23b. The block 25 is connected by a connecting bolt 26 with a spherical bearing 27, which receives a projecting shaft (not shown) provided on the underside of the inner ring member 14.

Since the small disk 23 and inner ring member 14 are connected as described above, the rotational movement of eccentric shaft 23a around the shaft 15a due to the rotation of motor shaft 15a is converted to the reciprocating rotational motion of inner ring member 14 around the shafts 13 and 20.

A projecting eccentric shaft 24a provided in the large disk 24 is received in a spherical bearing 28. A projecting shaft 29 is provided in the outer ring member 11, and a spherical bearing 30 is supported by the shaft 29. The spherical bearing 28 and spherical bearing 30 are connected by a connecting bolt 31. With such construction, the outer ring member 11 is also rotationally reciprocated around the shaft 12 and the shaft opposed thereto (not shown) as the shafts 15a and 22 rotate, in a similar manner to the inner ring member 14.

When the reciprocating rotational motions of the outer ring member 11 and inner ring member 14 are combined together, the central axis of rotation 8 of the mirror 4 in the scanner 2 mounted on the inner ring member 14 turns around the intersection point of the respective central axis of the reciprocating rotational motions of both ring members 11 and 14, with a predetermined inclination angle being maintained with respect to the vertical line. In other words, the locus of the central axis of rotation 8 by this turning becomes the side face of a circular cone (hereinafter simply referred to as a cone) with the intersection point as the vertex. Since the casing 3 containing the light beam generator and receiver is also attached to the underside of the inner ring member 14, it turns integrally with the inner ring member 14.

Reverse screw threads are cut in both ends of the connecting bolt 26 so that the connecting bolt 26 goes back or forth with respect to the block 25 and spherical bearing 27 when the connecting bolt is rotated, whereby the connecting length of the spherical bearing 27 and block 25 is adjusted. The connecting bolt 31 also adjusts the connecting length of the spherical bearings 28 and 30 into which the connecting bolt 31 is screwed, in a similar manner to the connecting bolt 26.

Thin disk 24b is provided on the large disk 24, and a sensor 33 for precession reference detection is provided to span over the thin disk 24b. For instance, the sensor 33 is a metal detection sensor or a light transmission/interuption type sensor, and by cutting a slit in a predetermined position of the circumference of the thin disk 24b, the reference position of precession can be detected on the basis of the detection signal of the slit which is output from the sensor 33.

Behind the motor 15, an encoder 35 for detecting the rotational position of the motor 15 is provided. By the output signal of encoder 35 and the output signal of sensor 33, the inclination direction or precession direction of the central axis of rotation 8 of the mirror 4 can be detected. Means for detecting the precession direction of the central axis of rotation 8 is not limited to the use of the encoder 35 and sensor 33. For instance, slits for detecting the rotation amount of the thin disk 24b may be cut in the thin disk 24b, separately from the slit for reference position detection, and these two kinds of slits may be detected by the two sensors. Also, it is possible to derive both signals indicating the rotation reference position and rotation amount of the motor 15 from encoder 35.

Although the precession locus of the central axis of rotation 8 is desirably a conical surface in order to evenly scan a light beam in the upward and downward directions and simplify the reception processing of the reflected light, it need not always be circularly conical, but it may be a cone the bottom of which is not a circle. For instance, by varying the eccentricity amount of the eccentric shaft 23a and/or 24a and making the respective maximum inclination angles of the outer and inner ring members 11 and 14 different, the locus to be drawn by the precession of the central axis of rotation 8 becomes an elliptic cone.

In the present embodiment, the amounts of eccentricity of the eccentric shafts 23a and 24a are set so that the precession locus becomes substantially a circular cone, or so that the respective maximum inclination angles of outer and inner ring members 11 and 14 are the same. Although the outer and inner ring members 11 and 14 are driven by one motor in the present embodiment, the respective ring members may be driven by separate motors. Of course, in such case, the individual motors should rotate at the same speed so that the central axis of rotation 8 draws a desired conical shape.

When the light beam is projected by the precession mechanism described above, the precession scan is performed in which the central axis of rotation 8 itself of the mirror 4 draws a cone, so that a plane (rotational scan plane) drawn by the light locus during the rotation of mirror 4 is not fixed at a particular one and single plane, but it always varies during one precession cycle.

By setting the rotation cycle of mirror 4 sufficiently shorter than the precession cycle of the central axis of rotation 8, a scanning locus can exhibit a fine pitch as described later.

The light tracks of the light beam produced by the scanner 2 of the present embodiment are described with reference to FIG. 3 which shows the light tracks drawn on a virtual cylindrical surface having a fixed radius and centering around the mirror 4.

As shown, the light beam 2E projected from the scanner 2 draws a mesh of light tracks on the virtual cylindrical surface because of the precessional motion of the central axis of rotation 8 of the mirror 4. In the present embodiment, the number of revolutions of mirror 4 is 2700 rpm and the number of precession of the central axis of rotation 8 or the number of revolutions of shaft 22 is 90 rpm, and thus the mirror 4 itself rotates 30 times while the central axis of rotation 8 precesses once in the shape of a cone. That is, during one cycle, 30 light tracks cross any vertical line 18 on the cylindrical surface at various heights thereof.

Description will be made to how easily the light beam is applied to the reflector during one precession cycle if the reflector is disposed at the position of the vertical line 18.

Figure 3:
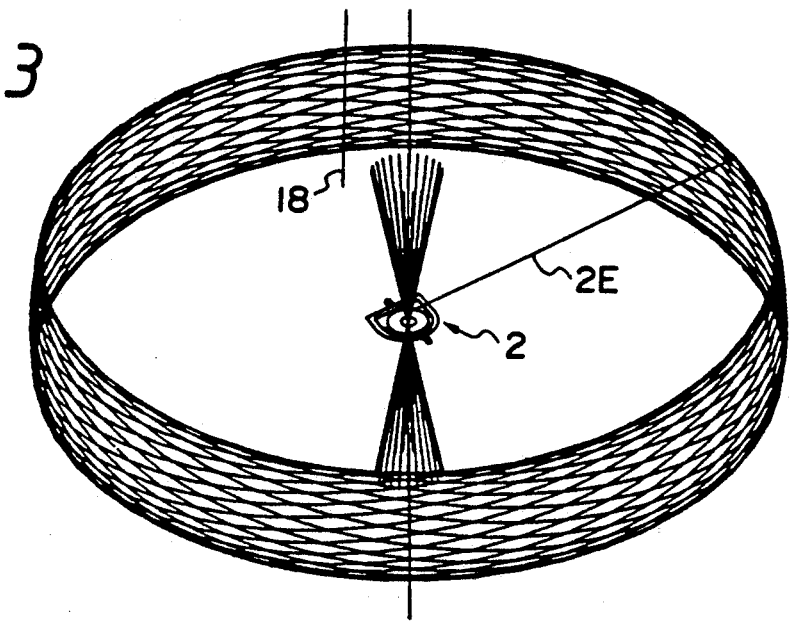
FIG. 3 is a perspective view showing the light tracks of a light beam.
Figure 4:
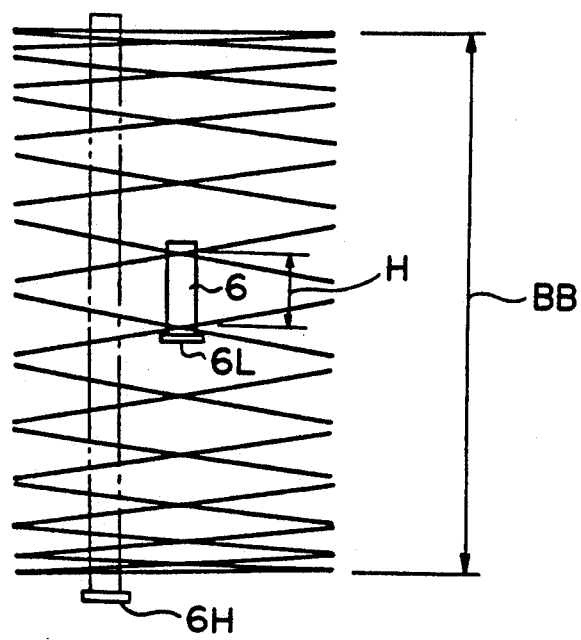
FIG. 4 is a diagram showing the relationship between the light tracks and retroreflector.

FIG. 4 shows an enlarged view of a part of the light tracks of FIG. 3. If the distance between the moving vehicle 1 and the reflector 6 is sufficiently short, the size of reflector 6 in the height direction is sufficiently long as compared with the variation width BB of the light tracks, as shown by 6H, and all the 30 light tracks will cross the reflector 6. On the other hand, if the distance between the moving vehicle 1 and the reflector 6 is very long, the size of reflector 6 in the height direction becomes relatively short with respect to the variation width BB of the light tracks as shown by symbol 6L. Even if the size of reflector 6 in the height direction is relatively short, at least one light track crosses the reflector 6 during one conical motion of the central axis of rotation 8 as long as the maximum vertical spacing H of adjacent two light tracks is smaller than the size of reflector 6 in the height direction 6L. Incidentally, only a model is shown in FIGS. 3 and 4 to avoid complexity and facilitate the plotting, and thus the number of illustrated light tracks is much less than the actual ones.

A fundamental principle for detecting the position in the working area and the advance direction of the moving vehicle 1 on which the light scanning means is mounted in accordance with the present embodiment will be described hereinbelow.

Figure 5:
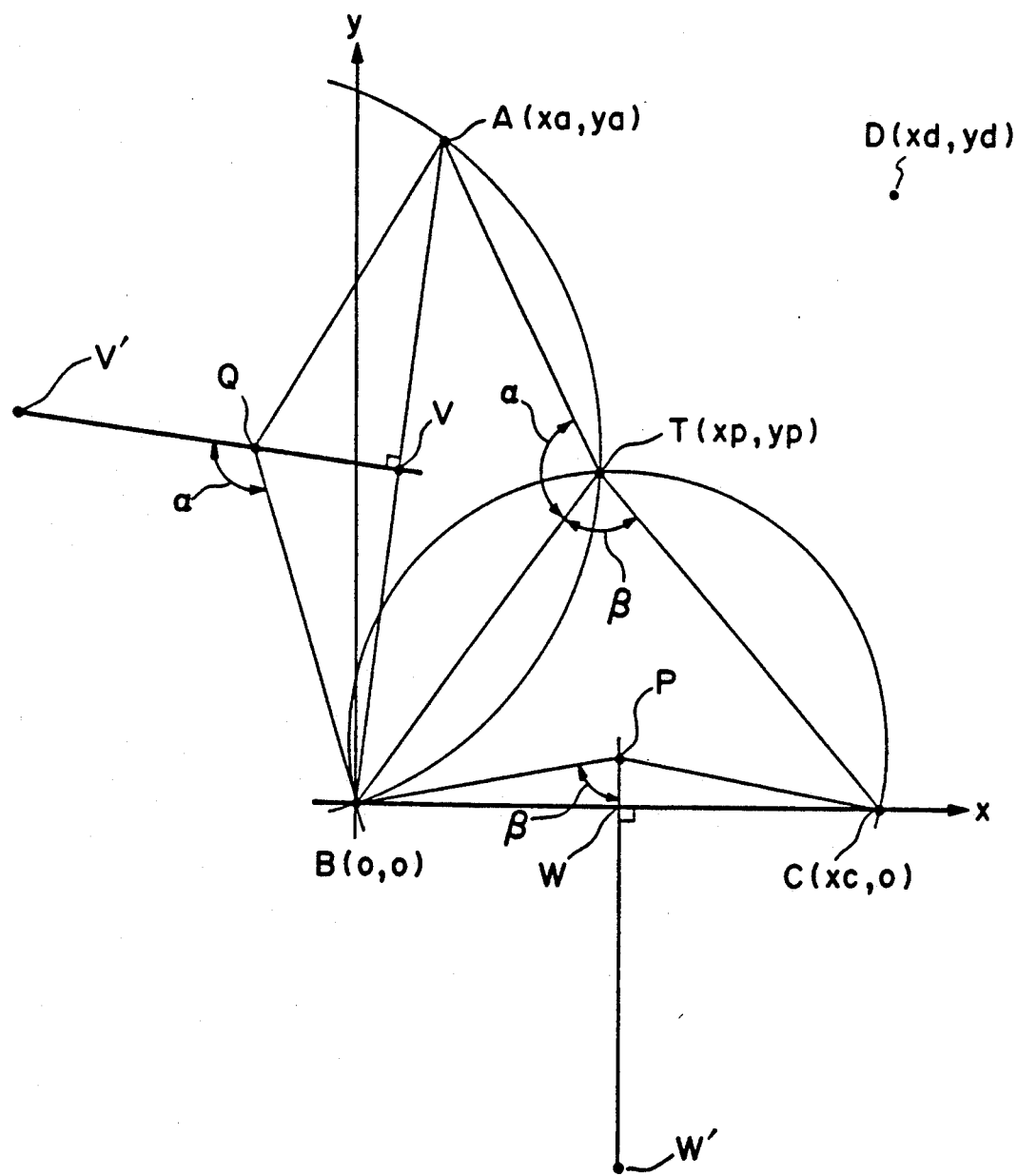
FIG. 5 is an explanatory view of the principle of calculating the position of the moving vehicle.
Figure 6:
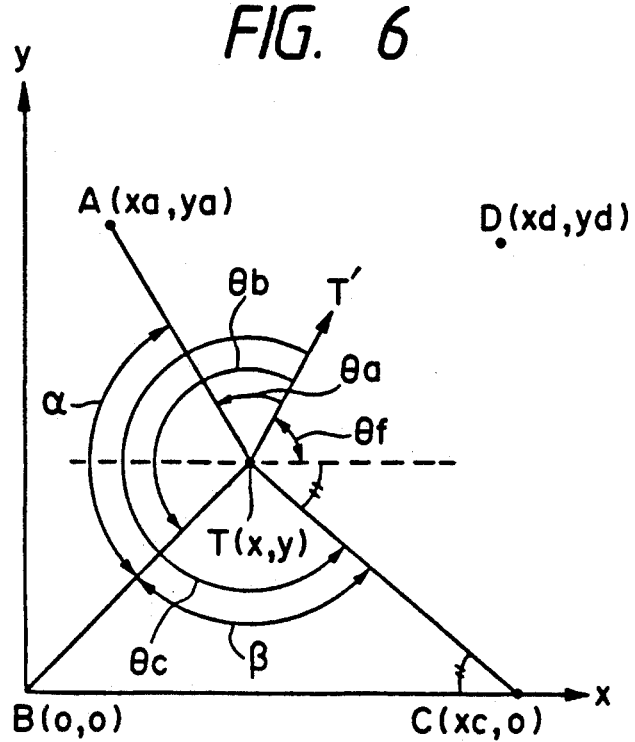
FIG. 6 is an explanatory view of the principle of calculating the advance direction of the moving vehicle.

FIGS. 5 and 6 are explanatory graphical representations each showing the positions of the moving vehicle 1 and those of the reflectors 6a–6d on an x-y coordinate system set in the working area of the moving vehicle 1.

In these figures, positions of the reflectors 6a–6d or points A, B, C and D, and the position of the vehicle 1 are represented by an x-y coordinate system wherein the reference point B is the origin, and a line extending between the reference points B and C is the x-axis.

As shown in FIG. 5, the position T of the moving vehicle is on a first circumscribed circle Q for a triangle ATB as well as a second circumscribed circle P for a triangle BTC. Accordingly, when two intersections of said two circumscribed circles Q and P are calculated, the position of the moving vehicle 1 is fixed. In this case, since one of said two intersections is the origin, the other intersection is the position T of the moving vehicle 1. The fundamental principle and the calculation equations are fully described in U.S. patent application Ser. No. 344,574 (now U.S. Pat. No. 5,011,288) and U.S. Pat. No. 4,947,324.

Furthermore, the advance direction of the moving vehicle 1 is calculated as follows. In FIG. 6, assuming that an angle between the advance direction TT' of the moving vehicle 1 and the x-axis is $\theta f$, the x-coordinate of the reference point C is xc, the coordinates of the moving vehicle 1 are (x,y), and the differential azimuth of the reference point C with respect to the advance direction TT' as reference is Oc, it gives the following equation.

$$\theta f = 360° - \tan^{-1}\{y/(xc-x)\} - \theta c \quad (1)$$

Figure 7:
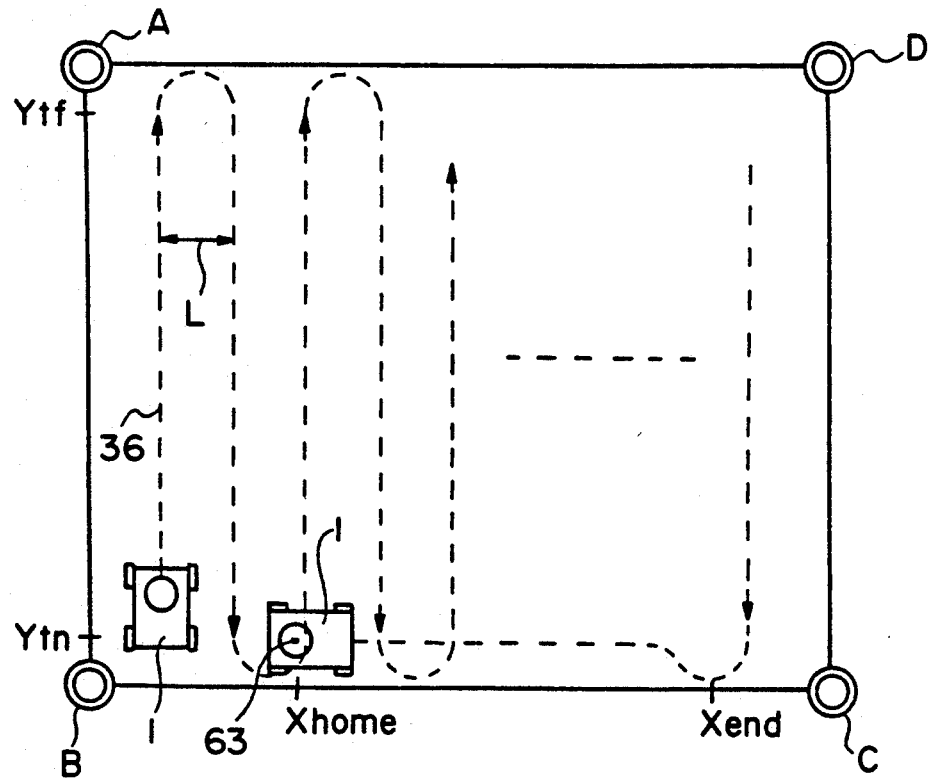
FIG. 7 is an illustration showing an arrangement of the traveling course of the moving vehicle and retroreflectors.

Next, steering control for the moving vehicle 1 based on the positional information found by aforementioned calculate equations will be described hereinbelow. FIG. 7 is a schematic diagram showing a traveling course of the moving vehicle 1 and the coordinates of the reference points A, B, C and D.

It is supposed that the moving vehicle 1 starts to travel at a start position near reference point B, travels a predetermined traveling course 36, and returns to home position 63. The traveling course comprises straight traveling courses set in parallel with each other with a spacing L therebetween and turning courses for connecting any two adjacent straight traveling courses. After traveling a straight traveling course which is parallel with the y-axis, when the y-coordinate reaches Ytn or Ytf, the moving vehicle 1 travels along a turning course with a steering angle being fixed to a certain value and moves to the next straight traveling course. If the x-coordinate of a straight traveling course is equal to or exceeds the last x-coordinate Xend, the vehicle returns to the home position 63 along the last turning course after it has traveled said straight traveling course.

In FIG. 7, for simplicity of explanation, the individual reference points A, B, C and D are placed so that the straight lines connecting adjacent two of them form a rectangle, and the straight traveling courses are made parallel with the line connecting reference points A and B or the y-axis, but the traveling course 36 can freely be established as long as reference points A–D are placed around the traveling course.

The control procedure is described with reference to a flowchart. The meanings of various parameters (symbols) used in the flowchart of FIG. 8 to be referred to are as follows.

$\theta(n)$ ... Azimuth determined on the basis of the light reception signal $\theta q(n)$ ... Predicted azimuth Cg(i) ... Number of light reception times in detection block i Am(i) ... Detected azimuth at detection block i Cp(n) ... Number of light reception times at reference point n Ap[n, I] ... Light reception azimuth of reference point n As[n, I] ... Precession direction when reference point n is detected.

Cm[n, I] ... Counter value of the number of revolutions of the mirror when reference point n is detected.

Aps(k) ... Azimuth representative of a detection block in which the number of light reception times is equal to or larger than the threshold value.

Aps(n) ... Azimuth when Aps(k) is set at n=1−4 in ascending order.

i ... Detection block number j ... Number of detection blocks in each of which the number of light reception times is equal to or larger than the first threshold value.

k ... Number of detection blocks in each of which the number of light reception times is equal to or larger than the second threshold value.

I ... Number representing the store order of the precession directions when mirror 4 has been rotated a predetermined number of times to detect reference point n.

J ... Number of continuous detection times of reference point n when mirror 4 is rotated a predetermined number of times.

K ... Maximum number of continuous detection times of reference point n when mirror 4 has been rotated a predetermined number of times.

e ... Last number of the numbers representing the store order of the precession directions when the maximum number of continuous detection times occurs.

Asc(n) ... Precession direction in which reference point n can be captured with a high probability.

Ac(n) ... Azimuth determined on the basis of a light reception signal in a straight traveling process.

Θt(n) ... Turn release angle of reference point n for ceasing a turn.

The reflected light reception process which is a basis of steering control is now described. The light reception process of a reflected light is performed as follows.

In the present embodiment, the mirror 4 rotates 30 times while the central axis of rotation 8 of the mirror precesses, as described above. That is, rotational scanning is performed 30 times while the central axis of rotation 8 rotates one time in the conical locus. The light reflected by the same reflector may be received many times by the 30 rotational scans. Accordingly, in the reflected light reception process, for detected light signals having substantially the same azimuths, the data of the light reception signals are collectively processed as one block. Hereinafter, this block is called a detection block.

As the light reception data of each detection block, the number of light receptions Cg(i) in the particular detection block "i" and azimuth Am(i) representative of the detection block "i" are stored. In the present embodiment, as azimuth Am(i) representative of the particular detection block "i", the latest detected azimuth in rotational scans is stored. This allows the capacity of a memory for storing azimuths to be saved and complexity in the processing to be avoided.

If the light signals are incident from only the predetermined reflectors, the number of the detection blocks must coincides with the total number of the disposed reflectors 6a-6d. However, in fact, light from reflecting objects other than the predetermined reflectors may be detected, and thus the number of detection blocks is not always equal to that of the predetermined reflectors. Then, in the present embodiment, by comparing the azimuth representative of each detection block with the predicted azimuth of each reference point which is determined in another processing and by checking whether or not they substantially coincide each other, each detection block can be made to correspond to a particular reference point.

Figure 8:
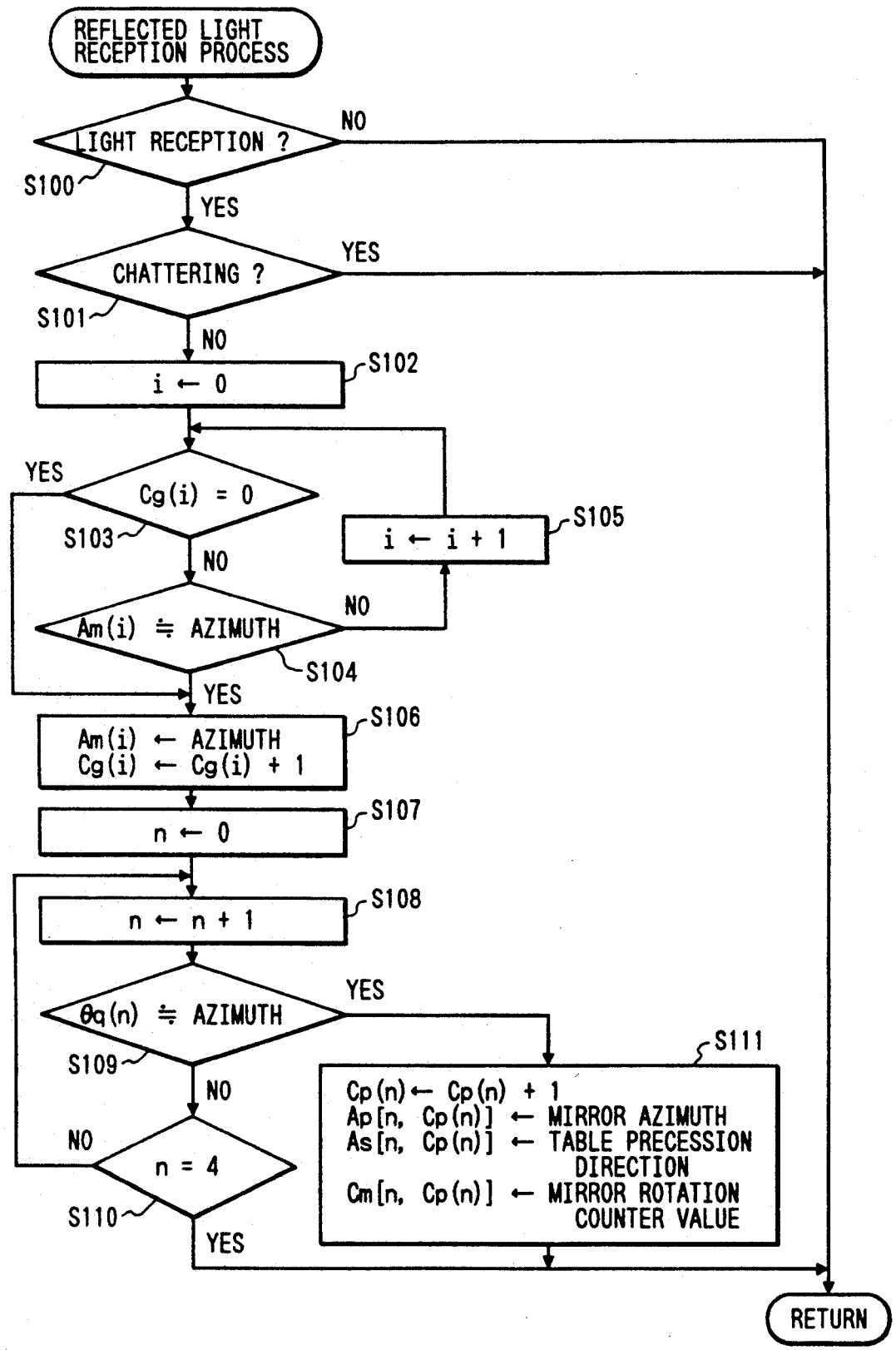
FIG. 8 is a flowchart of the processing of reflected light reception.

FIG. 8 is a flowchart showing the control procedure of the reflected light reception process.

In step S100, it is determined whether or not a light signal has been detected by a light beam receiver. If a light signal has been detected, the procedure goes to step S101. At this point, however, it cannot be discriminated whether the detected light is light reflected by some of reflectors 6a-6d.

In step S101, it is determined if the detection of signal is a quasi signal detection due to chattering on the basis of the rotational angle of mirror 4 after the previous processing. That is, if a light signal is detected again when mirror 4 has rotated only a very small angle, it is deemed to be chattering and the latter detected light signal is ignored. If it is not chattering, step S102 is entered.

In step S102, "0" is set in a variable "i" representing the number of a detection block. In the present embodiment, the mirror 4 rotates 30 times while the central axis of rotation 8 makes one rotation in a conical locus. That is, a rotational scan is performed 30 times while the central axis of rotation 8 rotates once in a conical locus. It is possible that the light reflected by the same reflector is received a plurality of times during the 30 rotational scans. Detection data on a plurality of light signals incident upon the receiver from substantially the same direction are collected into one group and stored as the data of the same and single reflector. This group is called a detection block. In consequence, if only the lights from the predetermined four reflectors 6a-6d are detected, then the number of the detection blocks is four and coincides with the number of the located reflectors.

In step S103, it is determined whether or not the number of light reception times Cg(i) in the detection block (i) is "0". Since "0" has been set in the parameter "i" in step S102, it is determined first whether or not the number of light receptions in the detection block of a detection block No. 0 is "0", that is, it is determined whether or not it is the first signal detected in this detection block.

This determination is positive in the first processing and control jumps to step S106, where the mirror angle, or the azimuth at which light was detected, is stored. The azimuth currently detected is stored as an azimuth Am(i) representative of the detection block (i), and the value of light receptions Cg(i) in the detection block (i) is incremented.

In step S107, the value "n" of a counter for identifying reference points is cleared. In the present embodiment, the counter values "1" to "4" are corresponding to the reference points A to D, respectively. In step S108, the counter value "n" of the counter is incremented.

In step S109, it is determined whether or not the azimuth currently detected is substantially the same as the predicted azimuth θq(n) established in an initial pole discrimination process or forward straight traveling process to be described later. Since the counter value "n" became "1" in step S108, it is determined whether or not the predicted azimuth and the detected azimuth of reference point A corresponding to the counter value "1" are substantially in coincidence.

Although the predicted azimuth θq(n) may be obtained by, for instance, adding a predicted amount of change α to the azimuth of the current detection, the azimuth itself latest detected may be used as the predicted azimuth without any hindrance in practical use because the reception interval of the reflected lights must be short as compared with the movement of moving vehicle 1, and the processing is also simple.

If the determination in step S109 is negative, it is determined in step S110 whether or not the counter value "n" is "4". The processings in steps S108 and S109 are repeated until the determination in step S110 becomes positive, determining whether or not the predicted azimuth of any reference point A-D coincides with the detected azimuth.

If the predicted azimuth $\theta q(n)$ substantially coincides with the detected azimuth, step S109 is positive and the flow advances to step S111. In step S111, the number of light reception times Cp(n) of the reference point represented by the counter value "n" is incremented because it is deemed that a predetermined reference point has been detected. Further, in step S111, the detected azimuth Ap[n, Cp(n)] of the reference point, the inclination or precession direction As[n, Cp(n)] of the central axis of rotation 8 of the mirror 4 and the rotation counter value Cm[n, Cp(n)] of the mirror 4 are stored. The rotation counter value of the mirror 4 is a value which indicates how many degrees mirror 4 has rotated from the reference precession direction based on the output signal of the sensor 33.

If, in step S103, it is determined that the number of light reception times Cg(i) in the detection block (i) is not "0" or it is not the first light reception in that block, the procedure goes to step S104. In step S104, it is determined whether or not the detected azimuth substantially coincides with the azimuth Am(i) of the light signal previously detected in the detection block (i). If both are coincident, the procedure flows to step S106, where the representative azimuth Am(i) of the detection block (i) is renewed with the azimuth latest detected and the number of light reception times Cg(i) is incremented.

If the determination in step S104 is negative, or the azimuth Am(i) of the previously received light signal in the detection block (i) is not coincident with or similar to the latest detected azimuth, then determining that it is a light from another detection block, the procedure goes to step S105 where the detection block number (i) is incremented. After incrementing the detection block number (i), in step S103, it is determined as to the incremented detection number (i) whether or not it is the first light reception.

Based on the azimuths of light reception signals or the azimuths of reference points stored by the reflected light reception process, the position and advance direction of the moving vehicle 1 are calculated as described later, whereby steering control of the moving body is performed.

Figure 9:
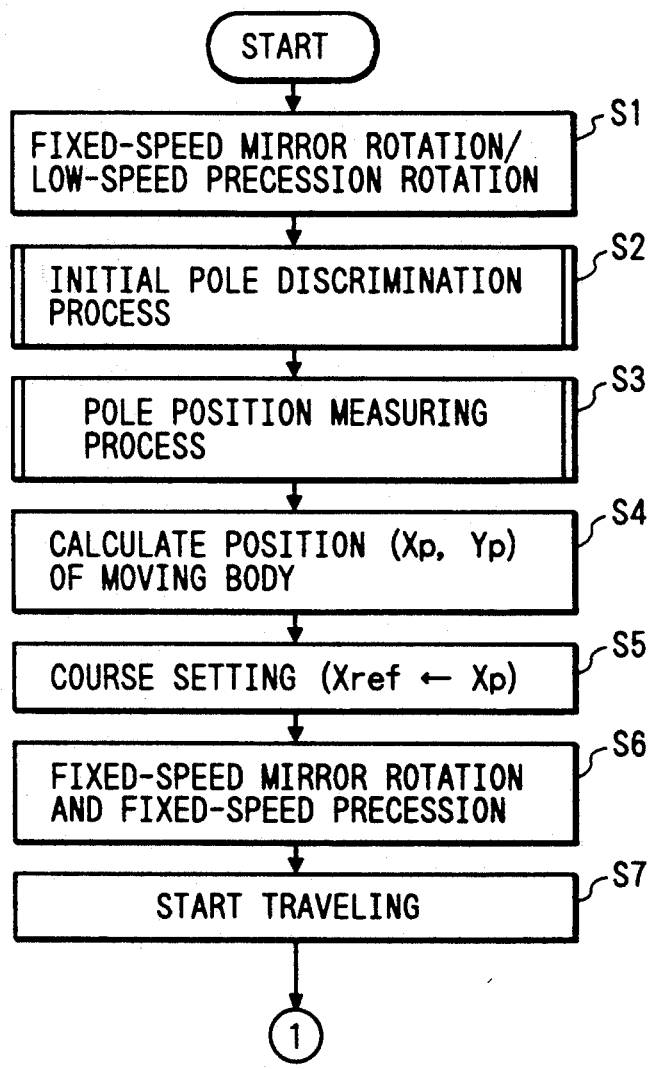
FIGS. 9 and 10 taken together are a flowchart showing the steering control of the moving vehicle.
Figure 10:
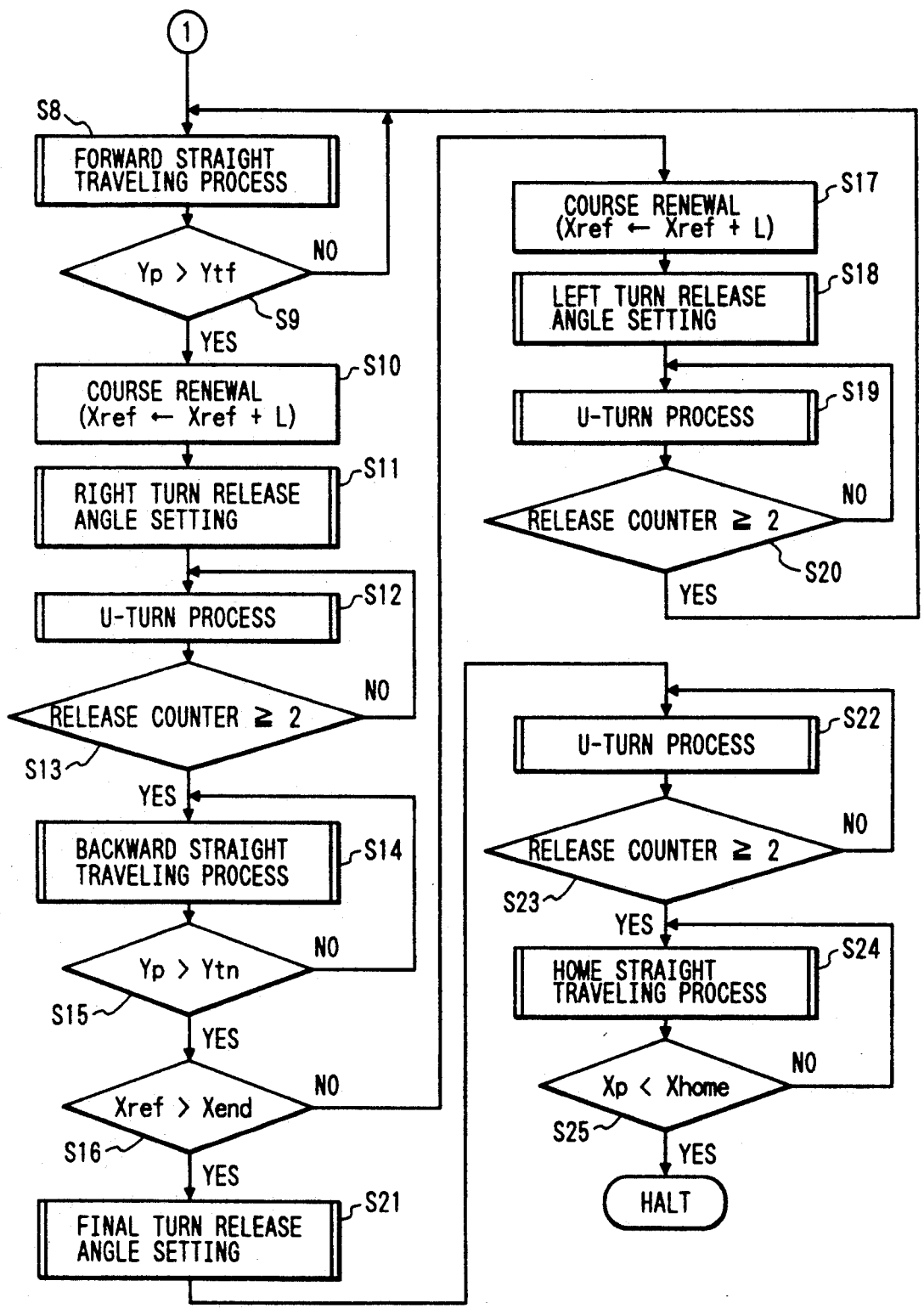

FIGS. 9 and 10 taken together are a general flowchart showing the steering control in the embodiment of the present invention.

In step S1, the motors 5 and 15 are started up to rotate the mirror 4 and the gimbal precession mechanism is operated so that its central axis of rotation 8 draws a conical locus. Here, the motor 15 is driven at a comparatively low speed so that a light beam can surely be applied to reflectors 6a–6d set at reference points A–D, respectively.

In step S2, an initial pole discrimination process, including a reflected light reception process, for deciding the initial azimuth of the reference point A-D or reflector 6a–6d is performed. In the initial pole discrimination process, based on the data of each detection block obtained in the reflected light reception process, four (that is the number of disposed reflectors) blocks in each of which the number of light reception times is greater than a predetermined threshold value are selected in descending order. The azimuths Am(i) of the selected detection blocks are determined to be the azimuths of the reference points A-D. The detail of this process is described later with reference to FIG. 11.

In step S3, a pole position measuring process is performed in which the respective distances from the moving vehicle 1 to the reference points A-D are measured and the positions of the respective reference points, namely, the reference coordinate values in an x-y coordinate system are calculated. This process is detailed later with reference to FIG. 15.

In step S4, the current position coordinates (Xp, Yp) of the moving vehicle 1 are calculated on the basis of the azimuth and coordinate values of the reference point calculated in steps S2 and S3.

In step S5, the current x-coordinate Xp of the moving vehicle 1 is set as the x-coordinate Xref of the first straight course. However, said setting of the x-coordinate is made on the assumption that the moving vehicle 1 is at the start position of traveling.

In step S6, the motors 5 and 15 are rotated at their respective preset speeds to rotate and incline the mirror 4.

In step S7, the rotation of the engine of the moving vehicle 1 is connected to the driving wheels to start the traveling.

Step S8 is a forward straight traveling process in which the moving vehicle 1 travels in the direction in which the y-coordinate value increases, and the details are described later with reference to FIG. 16.

In step S9, it is determined whether or not the forward traveling of the first straight course has been finished, depending on whether or not the current y-coordinate Yp of the moving vehicle 1 has exceeded a predetermined Ytf of y-coordinate. If it is determined that the moving vehicle 1 has completed the forward traveling of the straight traveling course, the process advances to step S10.

In step S10, the next straight traveling course is set by adding the distance L to the adjoining straight course to the current x-coordinate Xref of the straight traveling course.

In step S11, a right turn release (cease) angle setting process is performed for setting an azimuth for terminating the traveling along a turning course. The detail of this process is described later with reference to FIG. 17.

In step S12, a U-turn process is performed in which moving vehicle 1 is caused to travel in the right direction with a fixed turning radius while fixing the steering angle of the moving vehicle 1 at a predefined value. The detail of this process is described later with reference to FIG. 19.

In step S13, it is determined whether or not "1" has been exceeded by the value of a release counter for counting the number of reference points (counted in the process of FIG. 19) whose azimuth seen from the moving vehicle 1 has reached a predetermined right turn release angle. If the determination is positive, the process goes to step S14, judging that a turning course has been finished.

In step S14, a backward straight traveling process is performed in which the moving vehicle 1 is allowed to travel in the direction in which its y-coordinate decreases. Since the backward straight traveling process is similar to the forward straight traveling process of step S8, the detailed description of it is omitted.

In step S15, it is determined whether or not the moving vehicle 1 has completed the traveling of the backward straight traveling course, depending on whether or not the current y-coordinate Yp of the moving vehicle 1 is smaller than the predetermined Ytn.

In step S16, it is determined whether or not the current x-coordinate Xref of the straight course has exceeded the x-coordinate Xend at which the traveling is expected to stop.

In step S17, the next straight traveling course is set, when the judgement in step 16 is negative.

In step S18, a left turn release angle setting process is performed for setting an azimuth for terminating a leftward turning course. This process is the same as the right turn release angle setting process except that only the later described setting value of release angle is different.

In step S19, a U-turn process is performed. This process is similar to the U-turn process of step S12.

In step S20, it is determined whether or not the value of the release counter has exceeded "1". If this determination is positive, control returns to step S8, judging that the traveling of a turning course has been ended.

In addition, if the determination in step S16 is positive, the process advances to step S21. The determination in step S16 becomes positive when the traveling of all the straight traveling courses has been completed, and in step S21, a process is performed for setting the release angle for the last turning course. This process is similar to the right turn release angle setting, and thus the description of details are omitted.

In step S22, a U-turn process is performed, and in step S23, it is determined whether or not the value of the release counter has exceeded "1".

In step S24, a process is performed for causing the moving vehicle 1 to travel the straight traveling course for returning to the home position 63. This process is similar to the forward or backward straight traveling process, and thus the explanation of it is omitted.

In step S25, it is determined whether or not the current x-coordinate Xp of the moving vehicle 1 has become smaller than the x-coordinate Xhome of the home position 63. If this determination is positive, the procedure ends, judging that the moving vehicle 1 has returned to the home position 63.

Although, in the above description, a right turn is made after the first straight course, in fact, a left turn may be made after the first traveling course. In this case, it is only needed to exchange S9 and S11 with S15 and S18 in FIG. 10.

Figure 11:
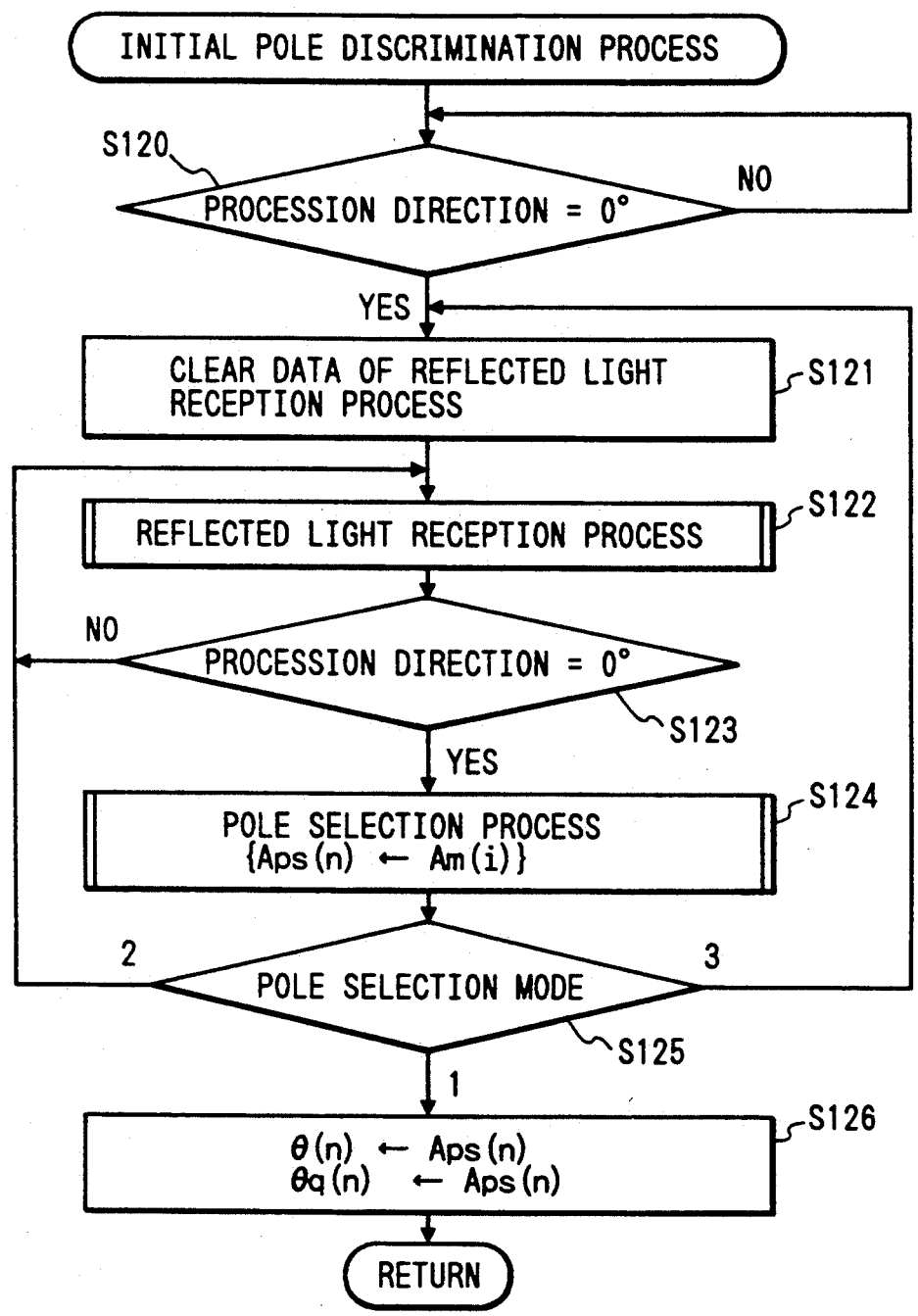
FIG. 11 is a flowchart of the processing of discriminating the initial pole.

Now, the initial pole discrimination process in the step S2 will be described in detail with reference to FIG. 11 which is a flowchart of the initial pole discrimination process.

In step S120, it is determined whether or not the precession direction becomes "0°", or whether or not the predetermined reference position of the thin disk 24b has been detected by the sensor 33 for detecting the precession reference. If it is determined that the predetermined reference position has been detected and the precession direction has becomes "0°", the process goes to step S121.

In step S121, the data obtained by the previous reflected light reception process is cleared.

In step S122, the reflected light reception process shown in FIG. 8 is performed. Since, in the reflected light reception process in the initial pole discrimination process of FIG. 11, no predicted azimuth $\theta q(n)$ has been decided yet, only the process steps corresponding to steps S100 to S106 in FIG. 8 are executed.

In step S123, it is again judged whether or not the precession direction is "0°", that is, whether one cycle of precession during which the center axis of rotation 8 draws a conical surface has been finished. The reflected light reception process (step S122) is continued till the end of said one cycle, and the process flows to step S124 when said one cycle has terminated.

In step S124, a reference point selection process (pole selection process) is executed. In this selection process, for detection blocks having the largest number of light reception times Cg(i) are selected out of the detection blocks detected in the reflected light reception process, and then the azimuths Am(i) representative of those detection blocks which have been selected are set in Aps(n) in ascending order.

In the present embodiment, n=1 to 4 because the reference points are four, A to D. As already described with respect to the reflected light reception process shown in FIG. 8, the detected azimuth Am(i) representative of a detection block is the newest one of the azimuths detected in the particular detection block. By using the newest data in this way, the storage capacity of the memory for storing the azimuths can be saved.

In step S124, a pole selection process for deciding pole selection mode "1" to "3" which is used for the decision in the next step S125, is performed. The pole selection process is described in detail in conjunction with FIG. 12.

In step S125, it is determined which pole selection mode of "1" to "3" has been decided in the pole selection process.

If the pole selection mode is "1", the procedure flows to step S126 because all the four reference points and their azimuths have been detected. In step S126, as the azimuths $\theta(n)$ of the reference points n (n=1 to 4), the azimuths Aps(n) obtained in the process of step S124 are set. If the pole selection mode is "2", the procedure goes back to step S122 to continue the reflected light reception process since the number of the blocks in each of which the number of light reception times Cg(i) having exceeded a predetermined number has not yet reached a predetermined value (=4).

If the pole selection mode is "3", then there are five or more detection blocks in each of which the number of light reception times Cg(i) is equal to or larger than the predetermined value because of, for example, existence of reflecting objects other than expected. This means that the reference points could not be identified from the detection blocks, and thus the flow goes back to step S121 to redo the initial pole discrimination process.

Figures 23, 24:
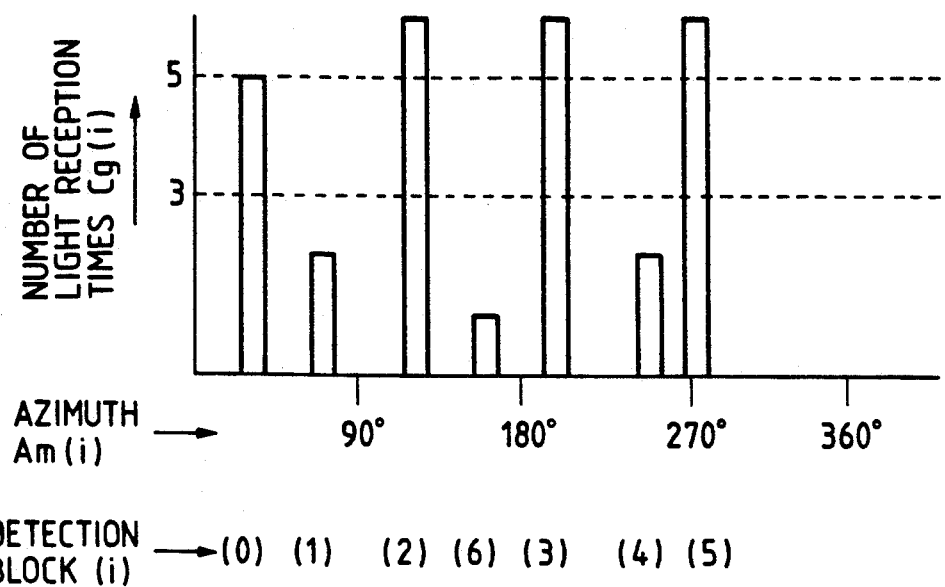
FIG. 23 is a graph showing the azimuth and the number of light receptions for each detected block.
FIG. 24 is a representation showing data of the number of revolutions of the mirror and precession directions when a reference point is detected.
Figure 25A:
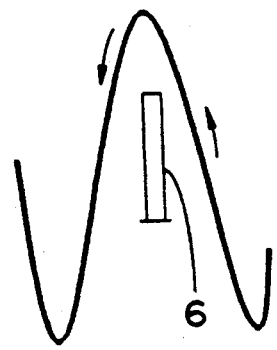
FIGS. 25A and 25B are illustrations respectively showing the relationship between the light tracks of the light beam and the retroreflector according to the prior art.
Figure 25B:
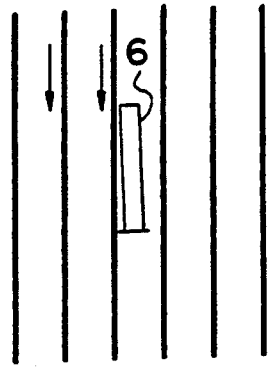

FIG. 23 shows an example of the data obtained in the reflected light reception process (S100-S106) in the initial pole discrimination process. In the initial pole discrimination process the reference point discrimination process is performed on the basis of the light reception data stored during one precession of the central axis of rotation 8, or during 30 rotations of the mirror 4. FIG. 23 shows an example of the light reception data stored while mirror 4 rotates 30 times.

In the same figure, the ordinate is the number of light reception times Cg(i) in the detection block (i), and the abscissa is the azimuth Am(i) of the detection block (i). As shown, the number of the detection blocks is seven (i=0 to 6), which means that light signals were received from seven directions during 30 rotations of the mirror 4. For each detection block in which the number of light reception times Cg(i) is plural, the azimuth Am(i)

is the newest detected data as described above. The detection numbers (i) do not always appear in ascending order, because the numbers are assigned in order of light reception.

Figure 12:
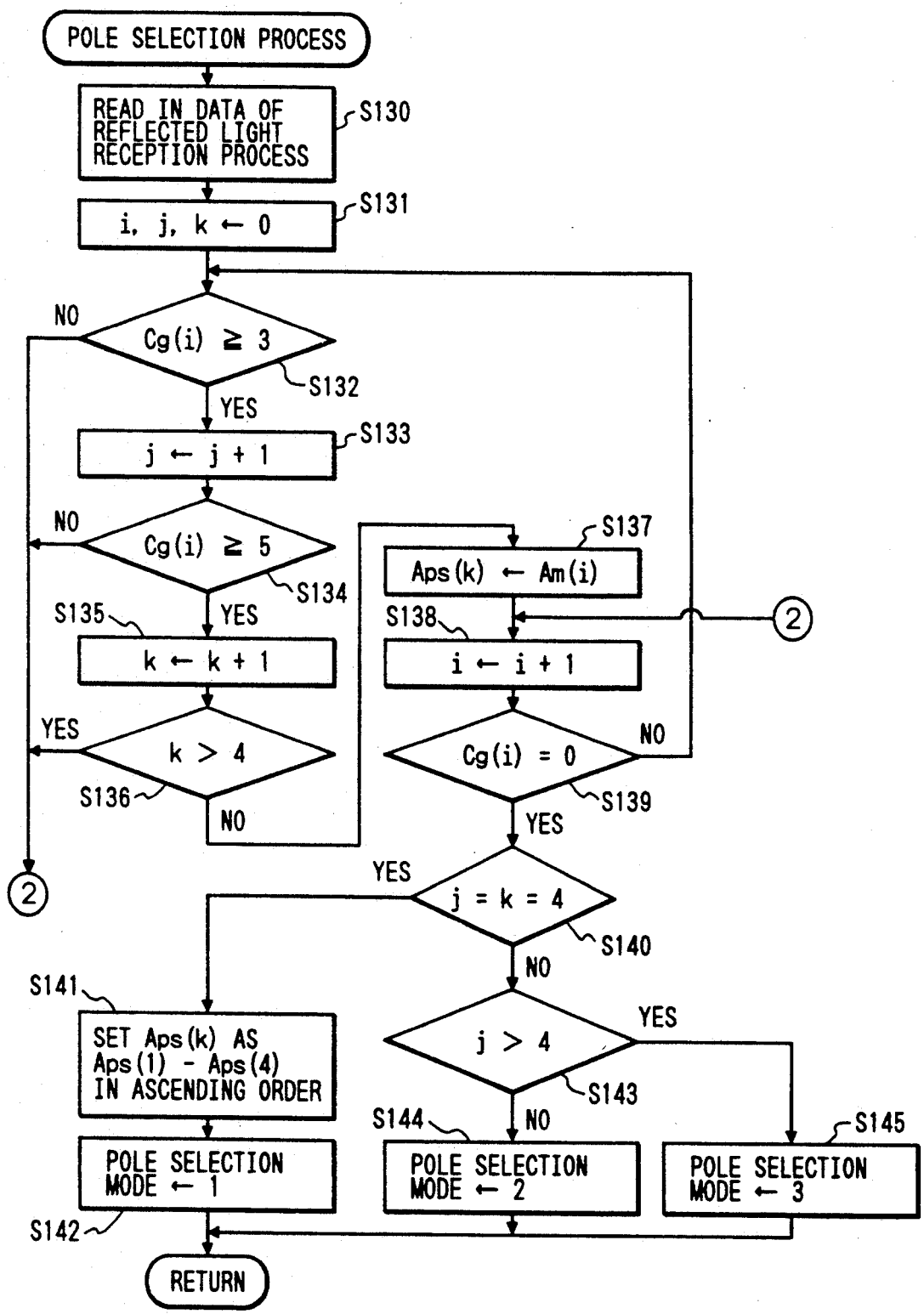
FIG. 12 is a flowchart of the pole selection process.

Referring to the light reception data, the pole selection of the step S124 is now described in detail with reference to FIG. 12 which is a flowchart of the pole selection process. In the pole selection process, the detection blocks in each of which the number of light reception times Cg(i) has reached the predetermined threshold value are picked out, and it is determined whether the number of detection blocks which were picked out coincide with the number of predetermined reference points, "4". If they are in coincidence, it is decided that the light reception data of the detection blocks are on the predetermined reference points A-D. If the number of extracted detection blocks is larger than the number of reference points, it is judged that the reference points cannot be identified and the data sampling is redone. If the number of the extracted detection blocks is smaller, the data sampling is further continued.

In the example of FIG. 23, two threshold values, "3" and "5", were set. The number of detection blocks in each of which the number of light reception times Cg(i) has reached the first threshold value, "3", is stored in a parameter "j", and the number of detection blocks having reached the second threshold value, "5", is stored in a parameter "k". And, based on the parameters "j" and "k", it is determined whether a reference point can or can not be identified.

First, in step S130, the data obtained in the reflected light reception process, namely, the light detection azimuth Am(i) and the number of reflected light reception times Cg(i) are read in.

In step S131, the parameters "i", "j" and "k" are cleared.

In step S132, it is determined whether or not the number of reflected light receptions in a particular detection block is equal to, or greater than three. If it is affirmative, the procedure advances to step S133, and increment the parameter "j" representing the number of detection blocks in each of which the number of light reception times Cg(i) is equal to, or greater than three.

In step S134, it is determined whether or not it is a detection block in which the number of light reception times Cg(i) is equal to, or greater than five. If it is affirmative, step S135 is entered to increment the parameter "k" representing the number of detection blocks which have received a light beam equal to, or more than five times.

In step S136, it is determined whether or not the value of the parameter "k" is greater than "4". In other words, it is determined whether or not the number of detection blocks in each of which the number of light reception times Cg(i) has exceeded five is greater than four that is the total number of the predetermined reference points.

If the judgement in step S136 is negative, then in step S137, the detected azimuth Am(i) representative of the detection block in which the number of light reception times Cg(i) has exceeded five is stored as azimuth Aps(k) for one of the predetermined reference points.

In step S138, the number "i" representing a detection block is incremented. In step S139, it is determined whether or not the numer of light reception times Cg(i) is "0". If the number of light reception times Cg(i) is not "0", there are still remaining detection blocks in each of which a number of light reception times is stored, and thus the procedure returns to step S132. If the number of light reception times Cg(i) is "0", then it is determined that there is no other block left, and the flow advances to step S140.

In step S140, it is determined whether or not both parameters "j" and "k" are "4", that is, whether or not the number of detection blocks having received a light beam three or more times and the number of detection blocks having received a light beam five or more times are both four.

If step S140 is positive, step S141 is entered, where the detected azimuths Aps(k) stored in step S137 are set as azimuths Aps(1)-Aps(4) in ascending order. In step S142, the pole selection mode is set at "1".

If the determination in the step S140 is negative, the flow goes to step S143 where it is detected whether or not the parameter "j" is greater than "4", or whether or not there are more than four detection blocks which have received a light beam three or more times. If step S143 is negative, the pole selection mode is set at "2" in step S144, and if positive, the pole selection mode is set at "3" in step S145. According to these pole selection modes, the determination of step S125 in the initial pole discrimination process of FIG. 11 is performed.

For instance, in the example light reception data shown in FIG. 23, the azimuths of the detection blocks (i=0, 2, 3, 5) in each of which the number of light reception times Cg(i) is equal to or greater than five are recognized to be the azimuths of the predetermined reference points.

Now, description will be made of a process for determining the coordinates of reference points, which is required for the pole position measuring process shown in step S3 in FIG. 9. First, description will be made of a process for determining the pole capture procession direction, which is to determine an inclination direction of the central axis of rotation 8 having a high probability of applying a light beam to each reference point. The process for determining the pole capture procession direction is summarized as follows.

FIG. 24 shows an example of the light reception data on a reference point A (n=1) detected in the reflected light reception process. In the same figure, the light reception data is shown, which was detected during one precession cycle, or during 30 rotations of the mirror 4. In the present embodiment, the light reception data during one rotation of the central axis of rotation 8, or during 30 rotations of the mirror 4 is taken in as described later. The precession direction is represented by the rotation angle of encoder 35 (FIG. 1).

The parameter Cm indicates a rotation counter value when a reference point n is detected after the count has been started at the position of precession direction of "0°", and in this case, the maximum of the parameter Cm is "30" since the light reception data during 30 rotations of the mirror 4 is sampled. The parameter "I" is a number representing the store order of precession directions when the reference point n is detected. That is, the maximum of the number "I" representing the store order is the number of light reception times Cp(n) of the reference point n.

In the process for determining the pole capture precession direction, groups in each of which the reference point n has been detected in a continuous series of cycles of the rotational scanning of the mirror 4, are picked out. For instance, the precession directions whose store number "I" is "1" and "2" as well as "3" to "6" are treated as the data of one group, respectively.

Of such groups, the range of the precession directions in the group having the biggest number of continuous detection times is detected. And the middle value representative of the range is calculated. It is determined that the obtained middle value is a precession direction in which a light beam can be applied to the reference point n with a high probability. The middle value may be the mean value of all the precession directions of the same group or may be the mean value of the maximum and minimum values. In the present embodiment, the mean value of the maximum and minimum values is calculated.

For instance, in FIG. 24, the counter value Cm continues for the store number "I" being "1" to "2" and "3" to "6", respectively, when the reference point n is detected, and the number of continuation times is larger for the store number "I" being "3" to "6". Accordingly, the reference point (pole) capture precession direction is decided by averaging the values of the precession directions for the store numbers "I" of "3" and "6". The averaged value is (108.6° + 144.4°) /2 = 126.5°.

Figure 13:
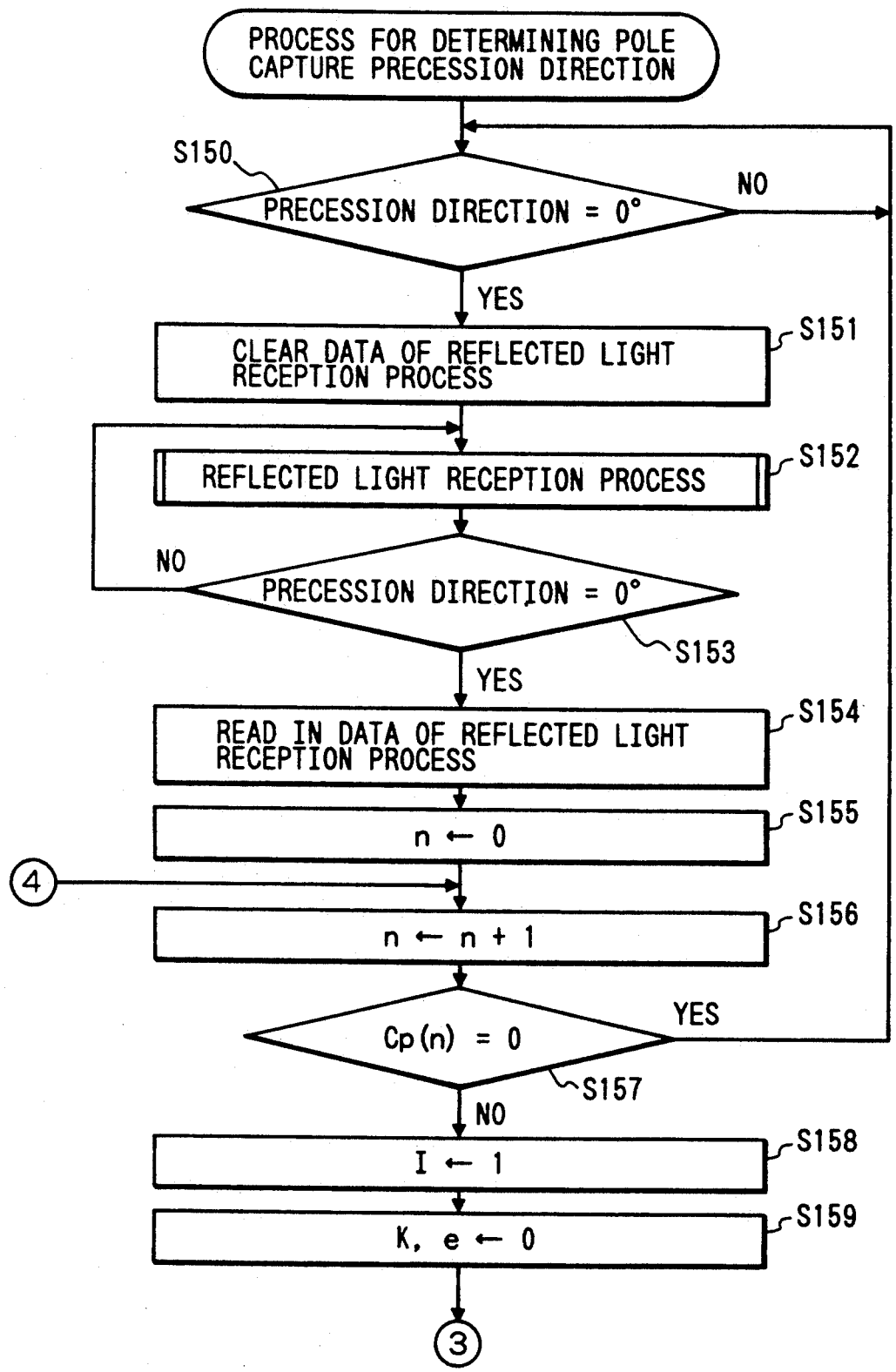
FIGS. 13 and 14 taken together are a flowchart of the processing of pole capture precession direction.
Figure 14:
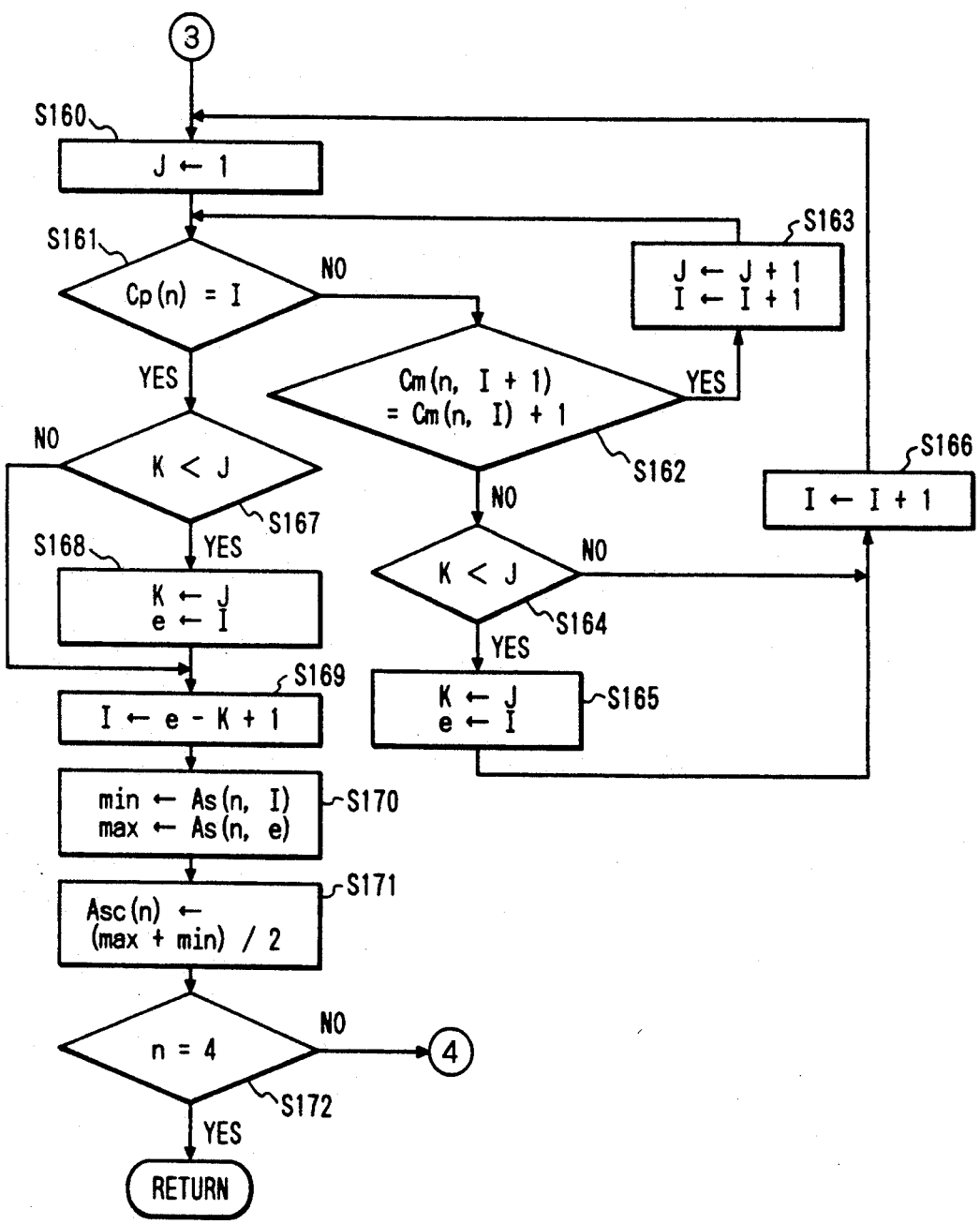

FIGS. 13 and 14 taken together are a flowchart of the process for determining the pole capture precession direction.

In FIG. 13, in step S150, it is determined whether or not the precession direction has become "0°". If the precession direction has become "0°", the process goes to step S151. In step S151, the data obtained by the previous reflected light reception process is cleared. In step S152, the reflected light reception process described in conjunction with FIG. 8 is newly performed.

In step S153, it is determined whether the precession direction has become "0°" for the second time, i.e., whether one cycle of the precession scanning has been performed.

If the determination in the step S153 is affirmative, the flow goes to step S154 where the data obtained in step S152 or step S111 (FIG. 8) of the reflected light reception process is read in. In step S155, a discrimination counter "n" of a reference point is cleared. In step S156, the counter "n" is incremented.

In step S157, it is determined whether or not the parameter Cp(n) is "0", which Cp(n) represents how many times the reference point "n" indicated by the counter "n" has been detected, thereby to determine whether or not the reference point "n" has ever been detected. If the answer is positive, the process goes back to step S150, and light reception data is again sampled.

If step S157 is negative, the process advances to step S158 where "1" is set in the parameter "I". The parameter "I" is a number for identifying the order of storing the precession directions in which the reference point "n" could be detected, as described above.

In step S159, the parameters "K" and "e" are cleared. The parameter "K" indicates the maximum number of continuous detection times when the light signal has been detected at the substantially same direction each time the mirror 4 makes one rotation. The parameter "e" represents the store number of the last oscillation direction of the store numbers "I" of oscillation directions when light signals have been continuously detected.

In FIG. 14, in step S160, "1" is set in the value "J" of the counter for counting the number of continuation times of light reception signals.

In step S161, by determining whether or not the parameter Cp(n) representing the number of detection times of the reference point n equals to the parameter "I" representing the store number of precession directions, it is determined whether or not all the stored light reception data have been checked.

Usually there are existing a plurality of light reception data, and since the number "I" was set to "1" in step S158, the determination in step S161 is negative first and it is determined that all the light reception data have not completely checked, and the procedure goes to step S162.

In step S162, as to the rotation counter value Cm of the mirror 4, it is determined whether or not the counter value Cm(n, I+1) at the current detection equals a value obtained by adding "1" to the counter value Cm(n, I) at the last detection. That is, by checking the continuity of the counter value Cm, it is determined whether or not light signals have been continuously detected for each rotation of the mirror 4. If this determination is positive, the process advances to step S163 to increment the values of the counter "J" and the parameter "I", and returns to step S161.

On the other hand, if step S162 is negative, the process flows to step S164, where it is determined whether or not the counter "J" value is larger than the parameter K. If the determination is positive, the process goes to step S165, where the maximum number of continuous detection times "K" is renewed with the current number of continuous detection times "J", and the parameter "e" representing the store number of the last precession direction in the continuous detection of light reception signals is renewed with the store number "I" of the current precession direction.

In step S166, the store number "I" of precession directions is incremented.

If step S161 is positive, or it is determined that the checking of all the light reception data has been finished, the procedure goes to step S167. The description of steps S167 and S168 is omitted because they are the same processes as the steps S164 and S165.

In step S169, the first precession direction store number for the occurrence of the maximum number of continuous detection times is calculated and employed as the parameter "I".

In step S170, the data of the precession direction As(n, I) detected in the reflected light reception process, or of the precession direction stored correspondingly to the first store number for the occurrence of the maximum number of continuous detection times is set as the minimum value "min" of precession directions. In addition, As(n, e), that is, the data of the precession direction stored correspondingly to the last store number for the occurrence of the maximum number of continuous detection times is set as the maximum value "max".

In step S171, the mean value of the maximum value "max" and the minimum value "min" is calculated and stored as the precession direction Asc (n) for most surely capturing the reference point n. The precession direction Asc (n) for capturing the reference point "n" means a precession direction in which the reference point "n" can be detected with the highest probability.

In step S172, by judgment as to whether or not the counter value "n" is "4", it is determined whether or not the process for deciding the precession direction for capturing the reference point "n" has bee completed for all the reference points. If step S172 is negative, the process returns to step S156 in FIG. 13, while if it is positive, the process returns to the main routine.

Figure 15:
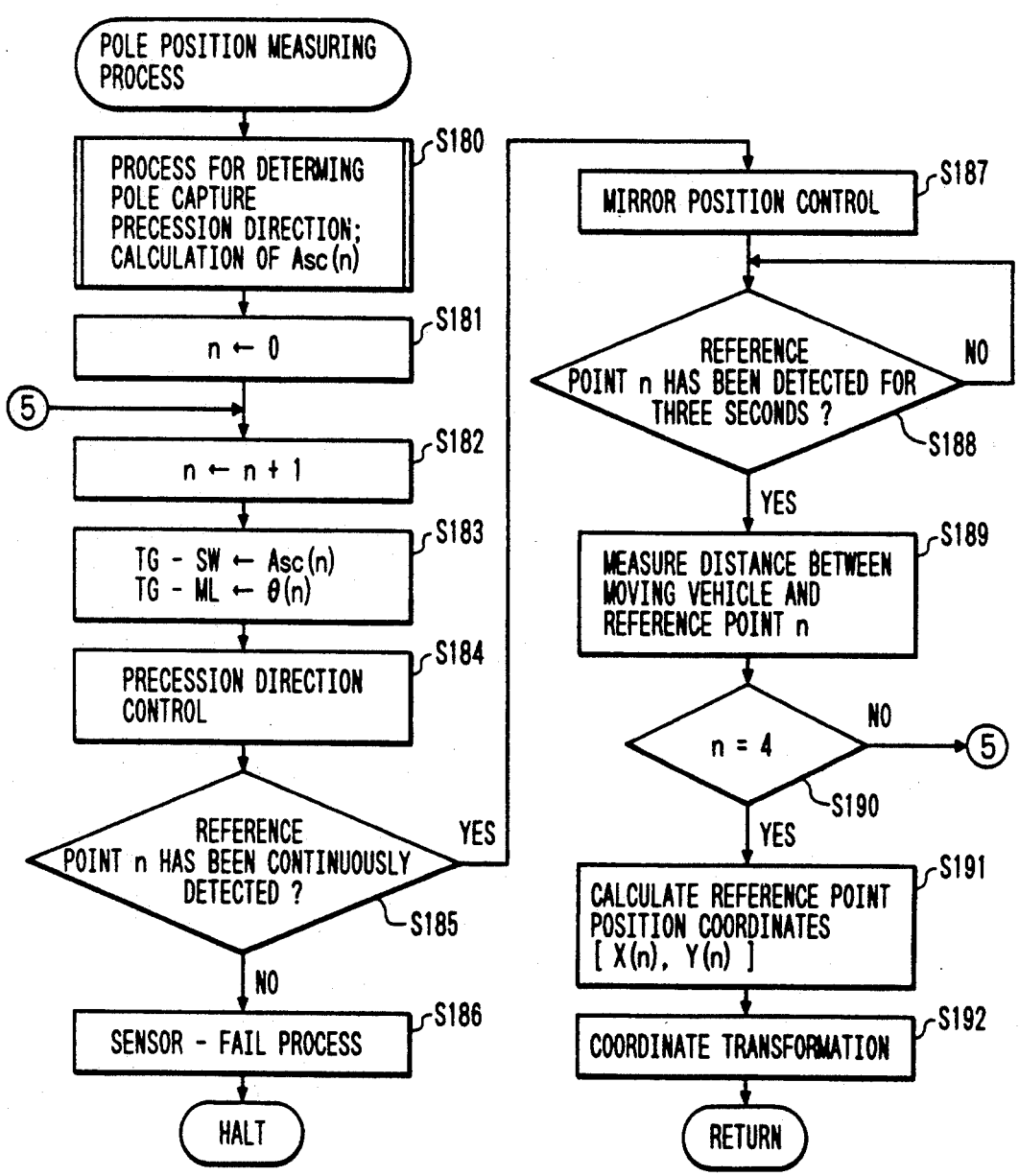
FIG. 15 is a flowchart of the processing of measuring the pole position.

A process is now described for deciding the reference point coordinates in accordance with the precession direction for capturing the reference point "n" (reference point capture precession direction). FIG. 15 is a flowchart of the pole position measuring process for deciding the reference point coordinates.

In step S180, the above-mentioned process for deciding the precession direction for capturing a pole is performed.

In step S181, the value of the counter "n" for discriminating the reference point is cleared, and in step S182, the counter value is incremented.

In step S183, the precession direction Asc (n) obtained in the process for deciding the precession direction for capturing the pole is set as the capture precession direction TG-SW for the reference point "n", and the azimuth θ(n) obtained in the initial pole discriminating process is set as the capture azimuth TG-ML for the reference point "n".

In step S184, a precession direction control is made for setting the precession direction at the precession direction TG-SW for capturing the reference point "n". The precession direction control is performed on the basis of the value of the encoder 35 for detecting the rotation of precession motor 15, for fixing the inclination direction of the central axis of rotation 8 at the capture precession direction TG-SW of the reference point "n". When the inclination of the central axis of rotation 8 is fixed, the rotational scanning surface drawn by light tracks is fixed to a specific one plane.

In step S185, it is determined whether or not the reference point n is continuously detected each rotation of the light track with the rotational scanning plane being fixed. If this determination is negative, it is judged that there is an abnormality such as failure of the sensor, and a display advising of the abnormality is provided or a warning is issued (the sensor-fail processing of step S186), and this process is temporarily aborted.

On the other hand, if the reference point is detected each cycle of scan and the determination in step S185 is positive, the flow advances to step S187.

In step S187, a mirror position control process is performed for adjusting the azimuth of the mirror 4 at the capture azimuth TG-ML of the reference point "n". The mirror position control process is performed on the basis of the value of the encoder 7 which detects the rotation of the motor 5 for rotating the mirror, and the motor 5 is energized until the value of the encoder 7 substantially coincides with the capture azimuth TG-ML for the reference point "n". When the value of the encoder 7 substantially coincides with the capture azimuth TG-ML for the reference point "n", the motor 5 is deenergized and the electromagnet 16 is energized so that the motor 5 can maintain its stop condition at that stop position. This allows the attracting plate 34 to be attracted to the electromagnet 16 and the stop position of the motor 5, that is, of the mirror 4 is fixed.

In step S188, the light reflected from the reference point "n" is detected for three seconds or longer (in general, for a predetermined time). Of course, this time is not limited to three seconds, but it is only required that whether the direction of the mirror 4 has been surely fixed can be confirmed.

In step S189, the distance between the moving vehicle 1 and the reference point "n" is measured on the basis of the detection result of the light reflected from the reference point "n". This can be calculated, for instance, by phase difference between the light beam emitted from the light beam generator and the reflected light detected at a light beam receiver.

In step S190, it is determined whether or not the counter value "n" for discriminating reference points is "4", or whether or not the distance from the moving vehicle 1 has been measured for all the reference points.

In step S191, on the basis of the detected distance between each of the reference points and the moving vehicle 1, and of the azimuth obtained by the initial pole discrimination process, the coordinates "X(n), Y(n)" of each of reference points A–D are calculated on some coordinate system with moving vehicle 1 being as the origin, for instance, a coordinate system with moving vehicle 1 being the origin and with the direction of reference point A being the positive direction of the x-axis.

In step S192, the above coordinates are converted to coordinates "x(n), y(n)" on a coordinate system with the reference point B being the origin.

The forward straight traveling process of the step S8 will be described in detail with reference to the flowchart of FIG. 16.

In step S200, the reflected light reception process (FIG. 8) is performed. In step S201, it is determined whether the central axis of rotation 8 has finished one cycle of precession for drawing a cone, on the basis of whether or not the precession direction is "0°". The reception process of a reflected light is continued until one cycle of precession is completed, and in step S202, the data obtained by the reflected light reception process are read in.

In step S203, the azimuth closest to the predicted azimuth θq is extracted out of the azimuths Am(i) obtained by the reflected light reception process, and it is stored in the azimuth Ac(n) of each reference points.

In step S204, the counter value "n" is cleared, and in step S205, the value "n" is incremented. In step S206, the azimuth Ac(n) is set in the azimuth θ(n) and the predicted azimuth θq(n) of the reference point "n".

If it is judged in step S207 that renewal of the azimuth θ(n) and the predicted azimuth θq(n) has been completed for all the reference points A–D, the procedure goes to step S208 to clear the data obtained by the reflected light reception process, advancing to step S209. If the judgement in step S207 is negative, the process goes back to step S205.

In step S209, on the basis of the azimuth θ(n) for each of reference points A–D measured as described above and their position information, the position (Xp, Yp) and advance direction θf of the moving vehicle 1 are calculated as already described with reference to FIGS. 5 and 6.

In step S210, the difference amount ΔX between the x-coordinate Xref for a preset traveling course (straight traveling course) and the current x-coordinate Xp of the moving vehicle 1, and the deviation angle Δθ of the advance direction θf from the straight advance direction are calculated.

In step S211, steering control is performed so as to decrease the difference amount ΔX and deviation angle Δθ.

The right turn release angle setting in the step S11 of FIG. 10 will be described below. When the moving vehicle 1 has arrived at the y-coordinate Ytf according to the forward straight traveling process, it starts to turn for moving to the adjacent straight traveling course. And, after turning to a predetermined position, it now needs to begin the backward straight traveling. The turn end position is a position at which the azimuths of some of reference points A–D as seen from the moving vehicle 1 become a predetermined turn release angle. In the present embodiment, the turn end position is decided when it is detected a predetermined number of times, for instance, two times that the azimuth for at least one reference point has reached a determined turn release (cease) angle.

Figure 17:
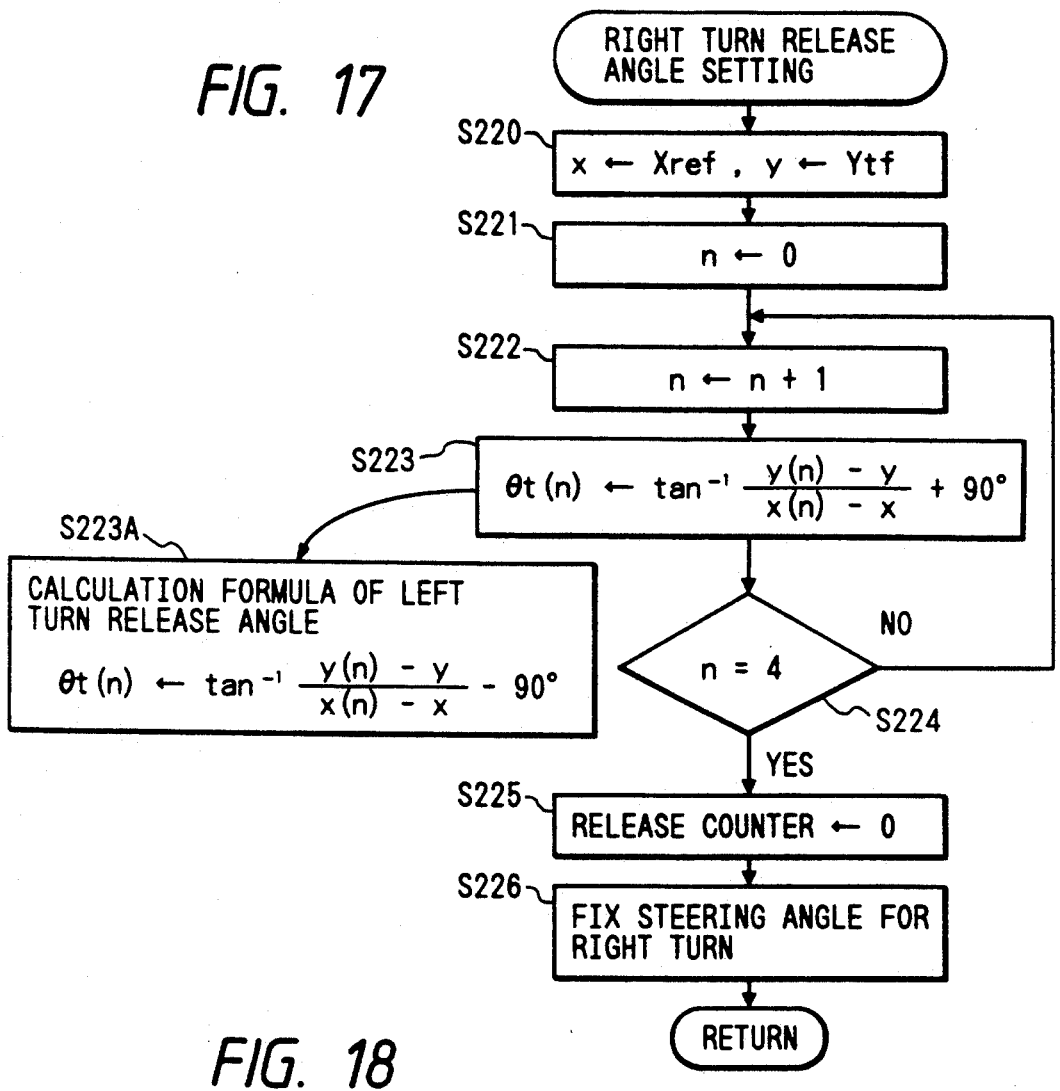
FIG. 17 is a flowchart of the setting of a right turn release angle.

FIG. 17 is a flowchart of the right turn release angle setting process in which the turn release angle after the forward straight traveling process is calculated and set.

In step S220, Xref and Ytf are set, respectively, as the coordinates (x, y) of the position at which the traveling of a turning course should be finished.

In step S221, the counter value "n" is cleared, and in step S222, the counter value "n" is incremented.

Figure 18:
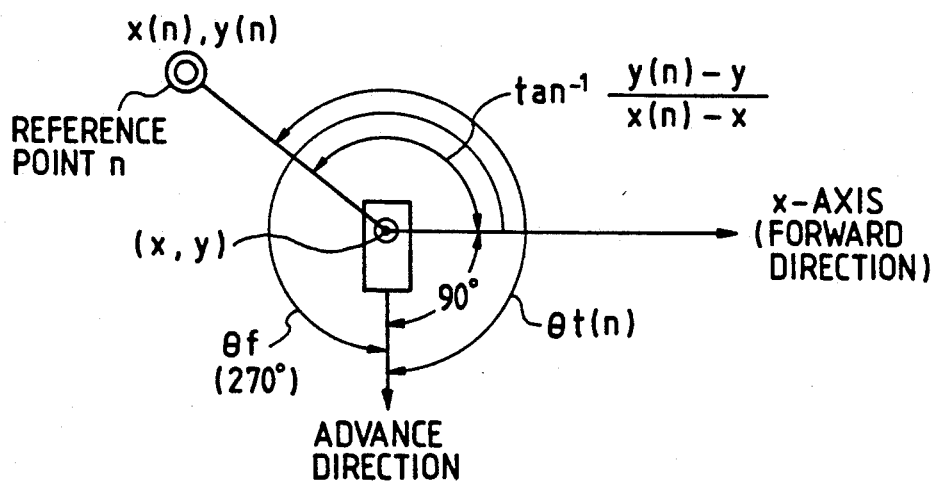
FIG. 18 is an illustration showing the principle of calculating the right turn release (or cease) angle.

In step S223, the azimuth $\theta t(n)$ of the reference point "n" at the position (x, y) for terminating the turning course traveling, is calculated as the turn release angle when the advance direction angle $\theta f$ has become 270° with respect to the x-axis (see FIG. 18). An offset amount is preferably added to the turn release angle $\theta t(n)$, for effecting the cease of turn a little earlier so as to prevent delay in transfer to the straight traveling course.

In step S224, whether or not the turn release angle has been set for all of four reference points A–D is determined by whether or not the counter value "n" has become "4". If the determination is positive, the process goes to step S225.

In step S225, the value of the release counter is cleared. The release counter is to count the number of reference points whose azimuth has reached the turn release angle, and a determination is made by the value of the release counter as to whether or not the turning is to be ended (step S13 of FIG. 10). In step S226, the steering angle of the moving vehicle 1 is fixed at a predetermined steering angle for right turn.

Figure 19:
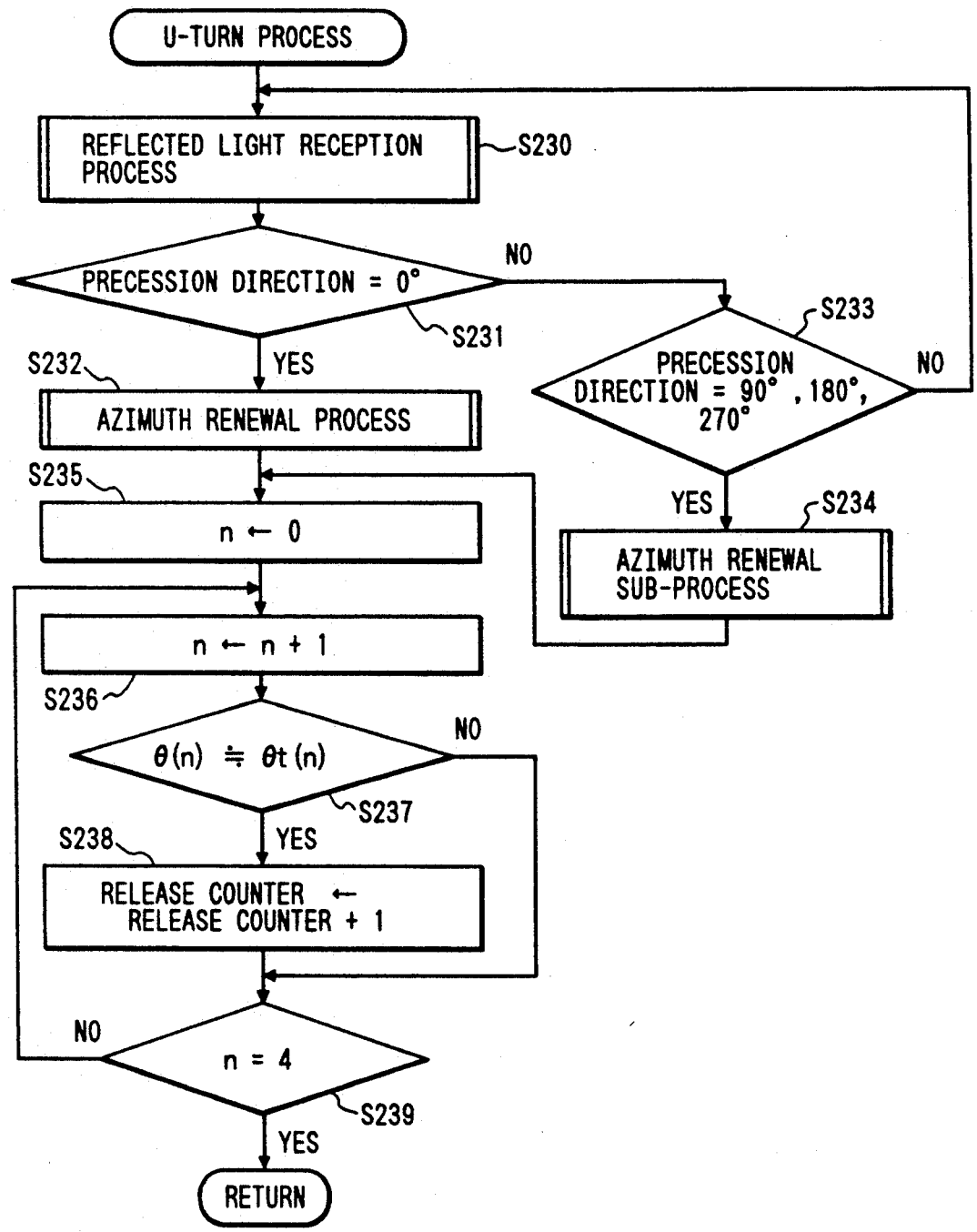
FIG. 19 is a flowchart of a U-turn process.

The process during the turning course traveling (U-turn process) of the step S12 is described below with reference to FIG. 19 which is a flowchart of the U-turn process.

In step S230, the reflected light reception process detailed with reference to FIG. 8 is executed.

In step S231, it is determined whether or not the precession direction is "0°". If this determination is positive, an azimuth renewal process is done in step S232. The azimuth renewal process is similar to steps S202–S208 of FIG. 16, and it renews the predicted azimuth $\theta q(n)$ and azimuth $\theta(n)$.

Since the azimuth renewal process is performed only at a time when the precession of the central axis of rotation 8 has completed one cycle, the detection accuracy can degrade to largely delay the cease of turn in the turning course in which the azimuth greatly varies in a unit time. Accordingly, in the present embodiment, the azimuth is also renewed in step S234 at the points of time when the precession direction is 90°, 180° and 270° (when step S233 is positive). The azimuth renewal subprocess of step S234 is almost the same as the azimuth renewal process of step S232 except that renewal of the predicted azimuth $\theta q(n)$ is not performed and the data of the reflected light reception process is not reset.

In step S235, the value of the reference point discrimination counter "n" is cleared, and in step S236, the value is incremented.

In step S237, it is determined whether or not the predicted azimuth $\theta(n)$ coincides with the right turn release angle $\theta t(n)$. If it is positive, the procedure goes to step S238 to increment the value of the release counter.

In step S239, it is determined whether or not the value of the reference point discrimination counter "n" is "4". By this procedure, a judgment is made as to whether or not the determination has been completed for all the four reference points as to whether or not their azimuths $\theta(n)$ coincide with the right turn release angle $\theta t(n)$.

When the determination has been completed for all the four reference points, the determination of the release counter is performed in steps S13, S20 and S23 of FIG. 10. And, if its value is equal to or greater than "2", the backward straight traveling process (S14), forward straight traveling process (S8) and home position straight traveling process (S24) are entered, respectively.

Turning to FIG. 10, in the setting of the final turn release angle in step S21, the turn release angle is calculated on the assumption that the moving vehicle 1 is at a coordinate (Xend, Ytn) and its advance direction is at 180° based on the x-coordinate, or it is directed to home position 63. This process is substantially the same as the right turn release angle setting except that the position when the turn release angle is set and that set data value are different. The calculation formula for the left turn release angle is depicted in FIG. 17 block S223A. The right and left release angle setting processes (steps S11 and S18) may be performed only once immediately after steps S8 and S15 of FIG. 10, respectively.

Figure 16:
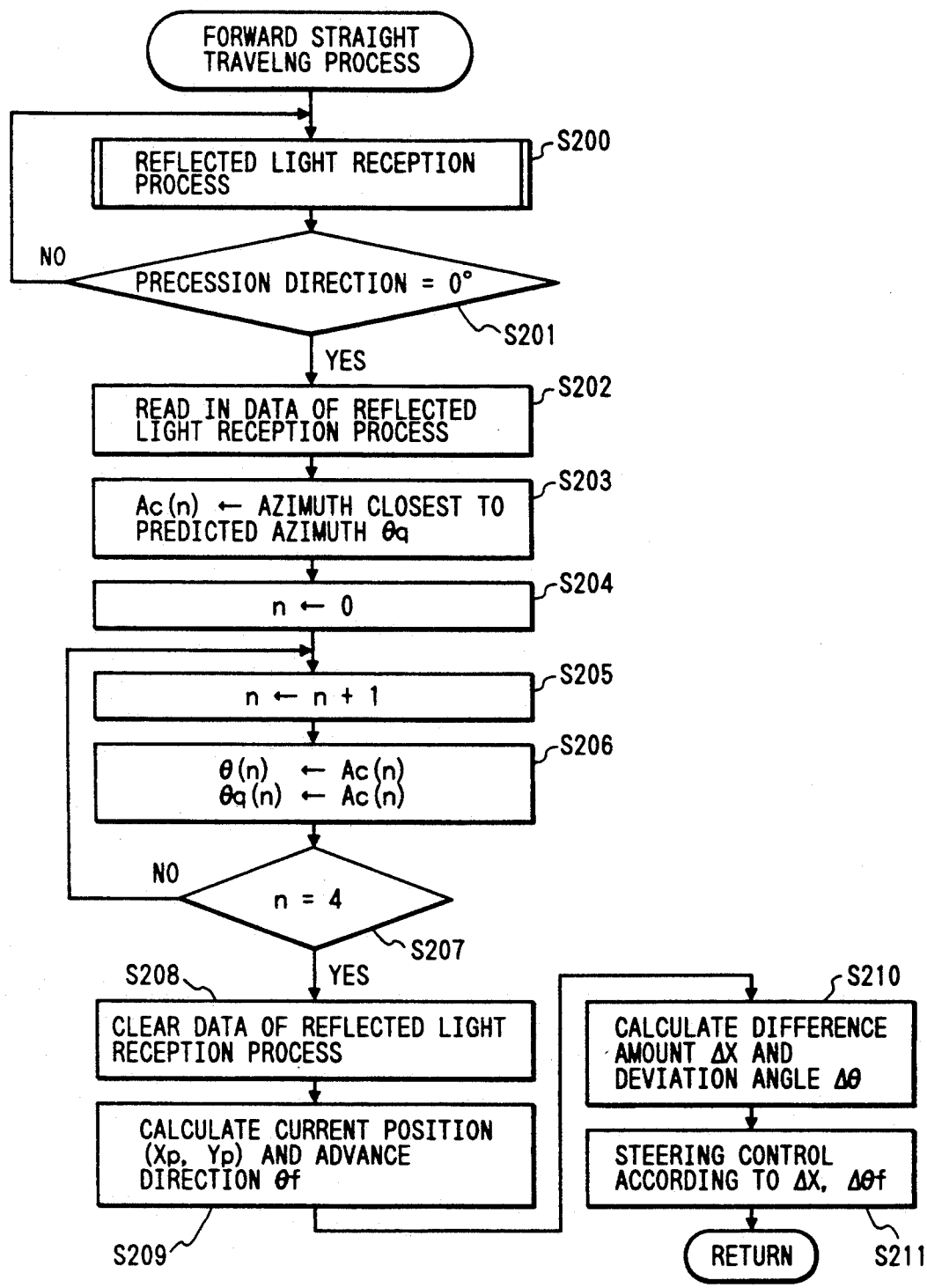
FIG. 16 is a flowchart of the processing of the forward straight traveling course of the moving vehicle.

The traveling of the straight course to home position 63, the home straight traveling process (step S24 of FIG. 10), after the completion of the final turning course traveling based on the final turn release angle is similar to the forward straight traveling process of FIG. 16 except that the course setting value in the calculation of the offset amount from the traveling course is different.

The control function for performing the above operation will be described below. First, the function of the reflected light reception process is described. The function of the reflected light reception processing section shown in FIG. 20 corresponds to the contents of the reflected light reception process, the initial pole discrimination process and the pole selection process shown in FIGS. 8, 11 and 12, respectively.

Figure 20:
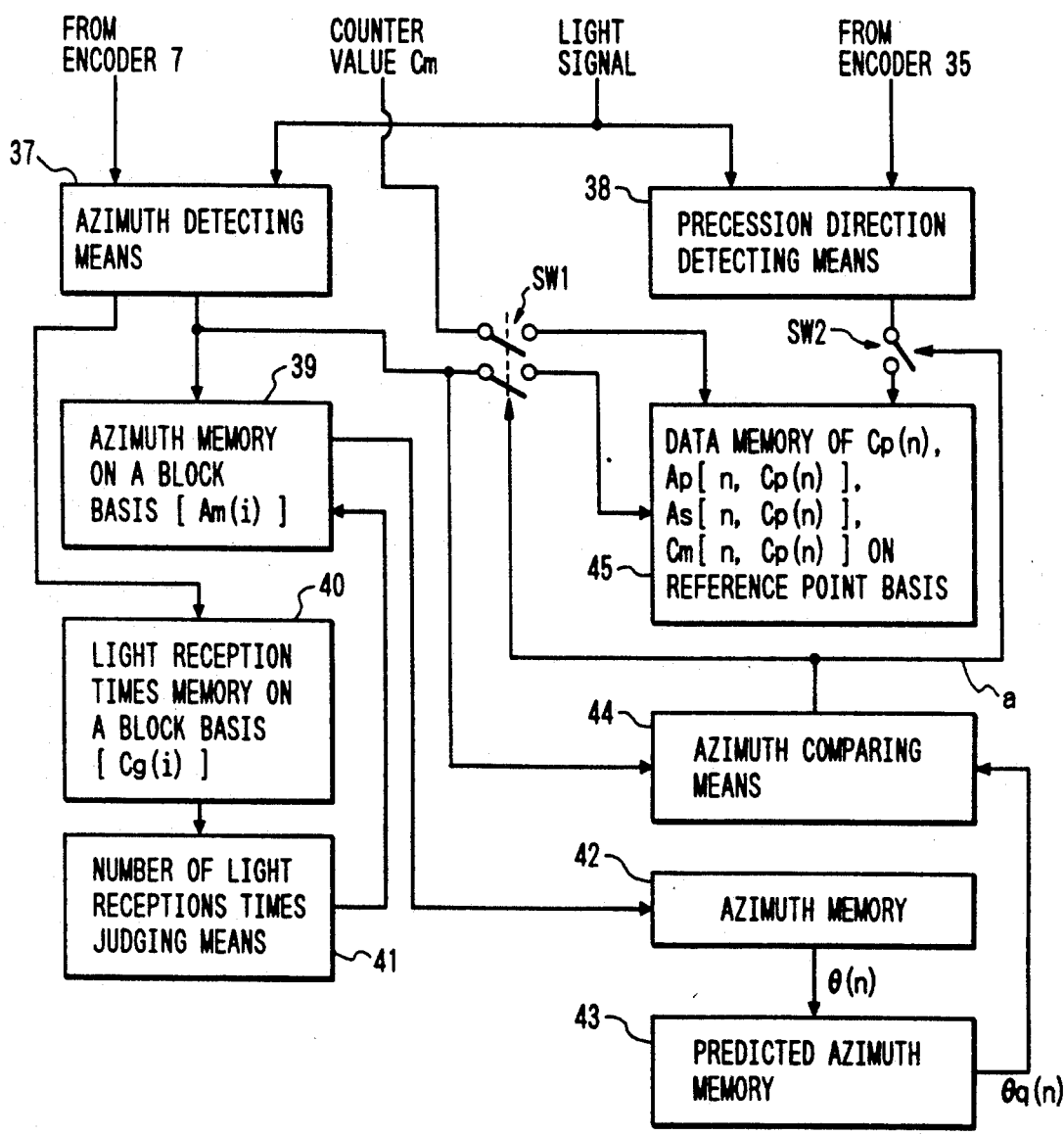
FIG. 20 is a block diagram showing the primary functions of the reflected light reception process.

In FIG. 20, a light signal from the outside is input to azimuth detecting means 37 and precession direction detecting means 38. The azimuth detecting means 37 has a counter for counting the number of the pulse signals input from the encoder 7, and the incidence direction (azimuth) of the light signal as seen from the moving vehicle 1 is detected on the basis of the pulse count value when the light signal is input. The detected azimuth is stored in memory means 39 for storing azimuth on a block basis.

For instance, the azimuth which was first detected is stored in memory region Am(0) as the azimuth of the first detection block. If the azimuth which was second detected substantially equals the azimuth which was previously detected in the first detection block, the storage data in Am(0) is renewed with the secondly detected azimuth, and if they are not in coincidence, the secondly detected azimuth is newly stored in a memory region Am(1). Thus, the light signals incident from the same or similar direction are stored as the data Am(i) of the same and single detection block.

In memory means 40, the number of light receptions is stored on the basis of the detection blocks.

Means 41 for judging the number of light receptions determines which detection blocks have received light beams more times, and extracts four detection blocks in descending order of the number of light reception times Cg(i). The azimuths representative of the four extracted detection blocks are read out from the memory means 39 for storing azimuths on a block basis and stored in azimuth memory means 42. At this time, they are stored in memory regions Aps(1)-Aps(4) in ascending order. In predicted azimuth memory means 43, the predicted azimuth, that is, the direction to be detected in the next scan on the basis of the currently detected azimuth is stored. This predicted azimuth may be the same value as the currently detected azimuth or it may be a value obtained by adding a predefined value to the currently detected azimuth, as previously described.

Azimuth comparing means 44 compares the predicted azimuth with the current detected value, and outputs a coincidence signal "a" if both angles are in coincidence. In response to the coincidence signal "a", normally open switches SW1 and SW2 are closed, and various data are input and stored in memory means 45 for storing said data on a reference point basis. Such various data are the azimuth Ap, precession direction As, the number of revolutions Cm of the mirror 4 since the sensor 33 generates the output, and the number of light reception times Cp(n) on a reference point basis. Here, the values Ap, As and Cm are stored as a function of the reference point "n" and the number of light reception times Cp(n) on a reference point basis.

The function of the pole (reference point) position measuring processing means is now described with reference to FIG. 21, which is a block diagram showing the main functions of the pole position measuring processing means.

In the same figure, continuous light reception detecting means 46 judges, based on the number of revolutions Cm of the mirror at the time when the light is received, whether or not the light signals are continuously detected each one rotation of the mirror 4. All the values of the precession directions in continuous periods during which the most light signals have been continuously detected are read out of the memory means 45 for storing data on a reference point basis, as shown in FIG. 20, and supplied to precession direction range calculating means 47. In precession direction range calculating means 47, the range of precession directions are calculated on the basis of the maximum and minimum data of the supplied precession direction data.

In means 48 for calculating capture precession direction on a reference point basis, based on the data showing the precession direction range, the middle point of the range is calculated. The value Asc(n) of the middle point is supplied to mirror direction fixing means 49. Azimuth $\theta(n)$ is supplied from the azimuth memory means 42 of FIG. 20 to the mirror fixing means 49. In the mirror fixing means 49, using the data $\theta(n)$ and Asc(n) as the target values, the direction of the mirror 4, namely, its precession direction and azimuth are adjusted to fix the mirror at the direction and inclination shown by these target values.

When the mirror 4 has been fixed, the distance between the moving vehicle 1 and each reference point is measured in distance measuring means 50. The distance is calculated on the basis of, for instance, the difference between the phase of the light signal emitted from the light beam generator means 51 and the phase of the light signal detected at the light beam receiver means 52. In reference point calculating means 53, the position coordinates [X(n), Y(n)] of a reference point are calculated on the basis of the measured distance and azimuth $\theta(n)$.

Figure 22:
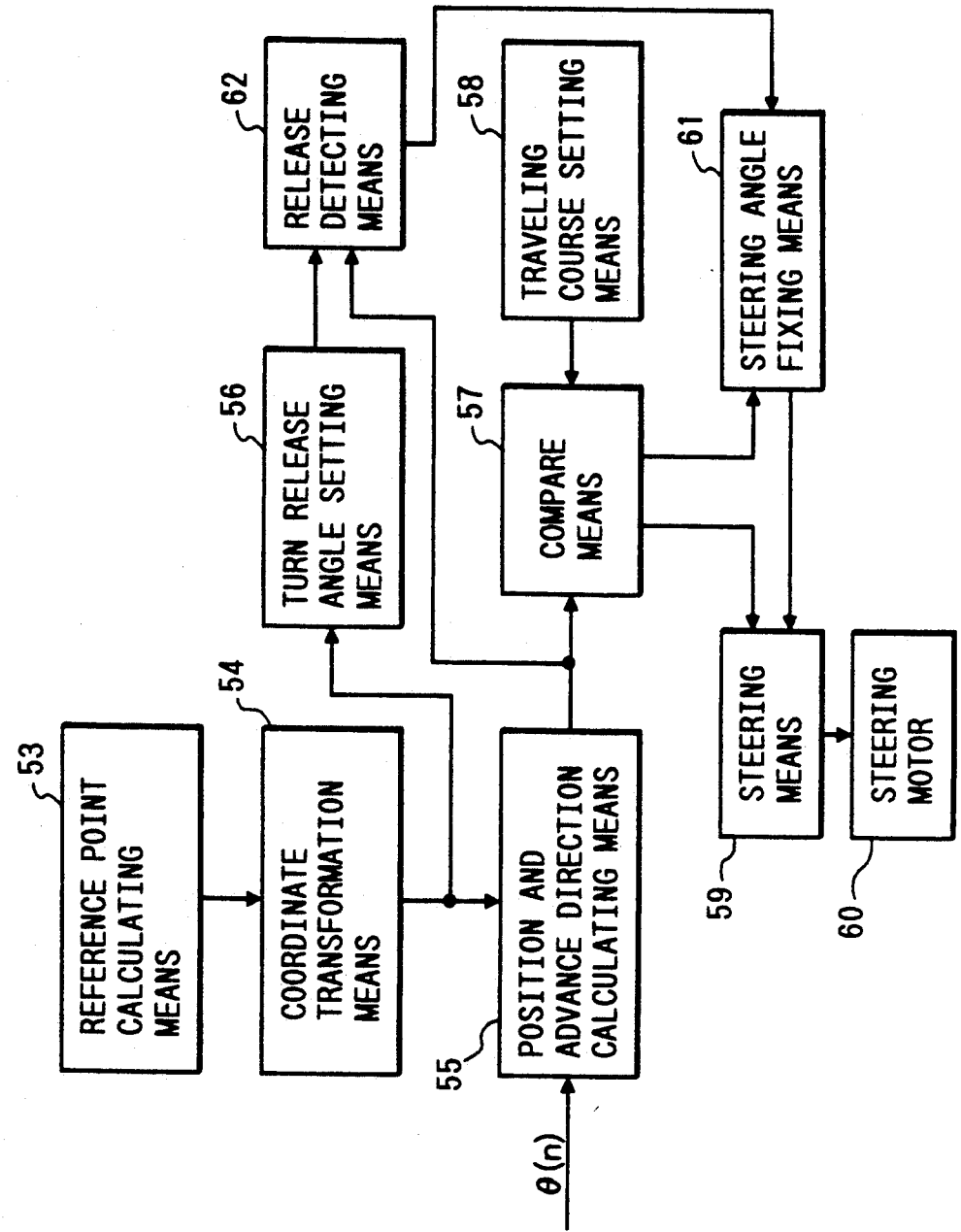
FIG. 22 is a block diagram showing the primary portions of steering control of the moving vehicle.

Subsequently, the function of the steering control means for performing the control during the traveling of moving vehicle 1 is described. FIG. 22 is a block diagram showing the main functions of the steering control means.

Figure 21:
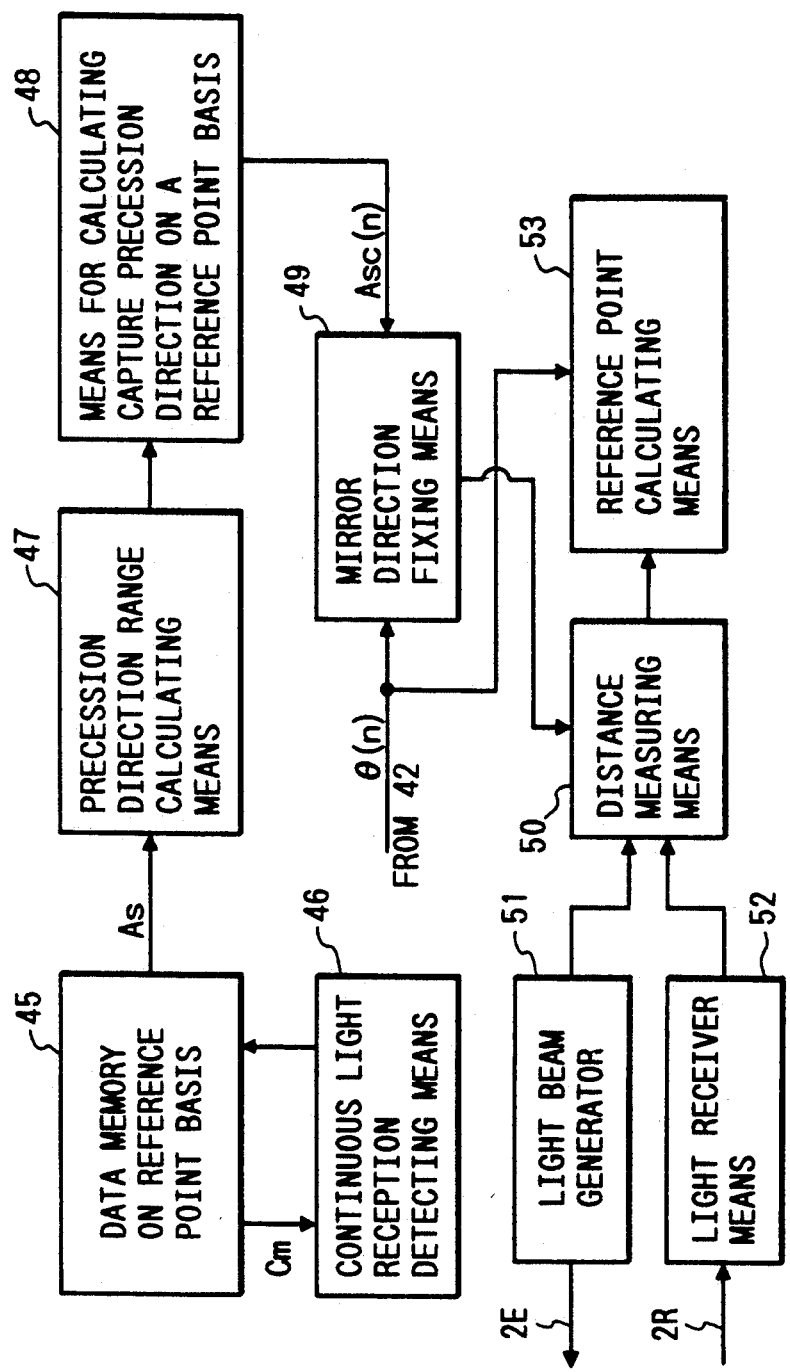
FIG. 21 is a block diagram showing the primary functions of the processing of detecting reference points.

The coordinates representing the reference point position which were calculated in reference point calculating means 53 of FIG. 21 are subjected to coordinate transformation, and thereafter supplied to position and advance direction calculating means 55 for calculating the position and advance direction of the moving vehicle 1. Since the coordinates calculated in reference point calculating means 53 are position coordinates in a coordinate system having the moving vehicle 1 as the origin, they have to be transformed to a position on a coordinate system with any one of the reference points A-D being the origin.

In the position and advance direction calculating means 55, the position (Xp, Yp) and advance direction $\theta f$ of the moving vehicle 1 are calculated on the basis of the position coordinates of the reference points A-D and the azimuths detected by the reflected light reception process.

In turn release angle setting means 56, the right turn release angle, left turn release angle and final turn release angle are respectively calculated and set, on the basis of the reference point coordinates and the coordinates of the predetermined turn end position. In compare means 57, the current position and advance direction of the moving vehicle 1 are compared with the traveling course established in traveling course setting means 58, and the difference is output to steering means 59. The steering means 59 determines a steering angle to compensate the supplied difference on the basis of the difference. The determined steering angle is provided to steering motor 60, and the wheels are steered according to the steering angle.

Compare means 57 also compares the position and advance direction of the moving vehicle 1 with the traveling course to detect the timing for causing the moving vehicle 1 to turn. When it detects the proper time, it outputs a detection signal to steering angle fixing means 61. The steering angle fixing means 61 responds to the detection signal to supply a predetermined steering angle for turn to the steering means 59, fixing the steering angle at the predetermined value.

Release detecting means 62 monitors when the advance direction of moving vehicle 1 matches the turn release angle. When both are in coincidence, it outputs a command signal for stopping the output of the turn steering angle to the steering angle fixing means 61, thereby stopping the turn.

Thus, in the present embodiment, the wheels of the vehicle 1 are steered according to the steering angle determined by the difference obtained in the compare means 57 and the predetermined turn steering angle, thereby to cause the moving vehicle 1 to travel along the predetermined traveling course.

Figure 26:
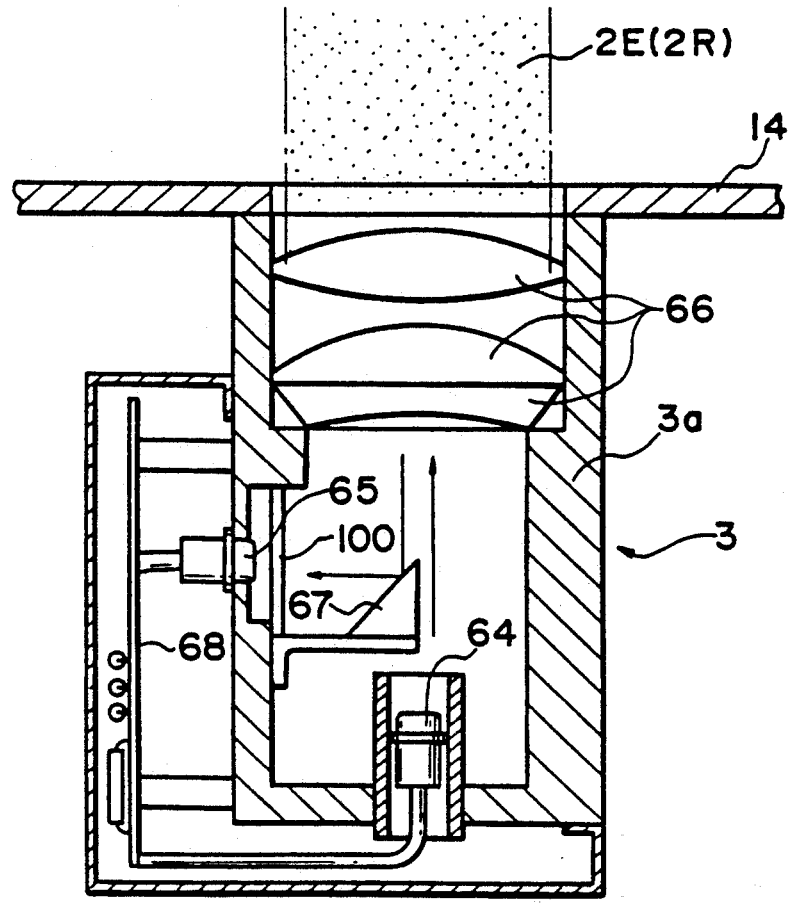
FIG. 26 is a cross-sectional view showing the arrangement of the light emitting device and the light beam receiver.

The light beam generator means and light beam receiver means of the present embodiment are described in detail below. FIG. 26 is a cross-sectional view showing the arrangement of the light beam generator and the receiver means enclosed within the casing 3. The casing 3 is fixed to the inner ring member 14. Light beam generator means 64 is attached to the bottom plate of casing body 3a, and light beam receiver means 65 is attached to the side plate thereof. The light beam generator means 64 includes a light emitting diode, for instance, and the light beam receiver means 65 includes a photodiode, for instance. A group of lenses 66 are placed on the upper portion of casing body 3a, and they change the light beam emanating from light beam generator means 64 to a parallel ray (light beam 2E) having a predetermined beam diameter. The incident light 2R reflected by the reflector is condensed by a reflecting mirror 67 on the light beam receiver means 65.

The light beam generator means 64 and light beam receiver means 65 are connected to a control means, not shown, via an interface circuit mounted on a substrate 68. In front of the light beam receiver means 65, a bandpass filter 100 is provided for transmitting only the reflected one of the light generated at light beam generator means 64, and only the light reflected by the reflector 67 is received at the light receiver means 65.

Description is now directed to the magnitude of the optical axis deviation when the light beam emitted from the light beam generator means is refractively reflected to the rotational scanning direction and projected from the scanner 2 after being changed in direction, and to the size of the mirror 4 required to cover the optical axis deviation.

Figure 27:
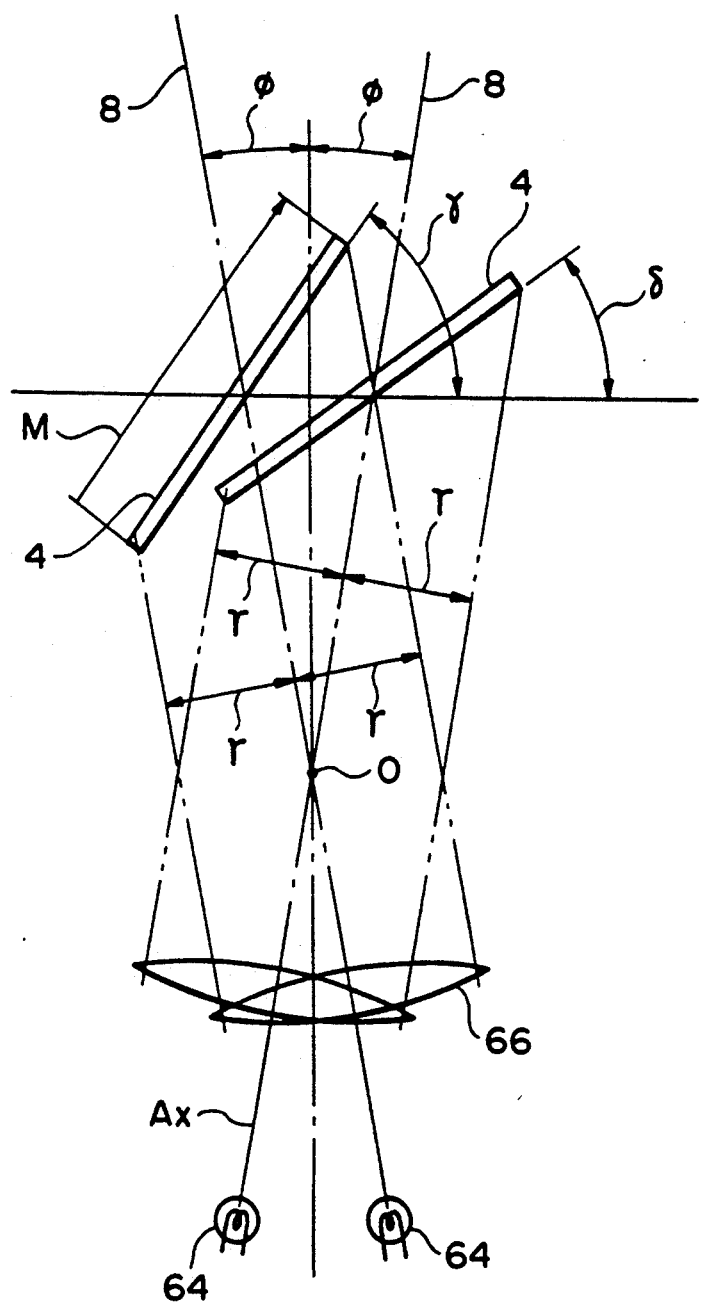
FIGS. 27 and 28 are illustrations showing the relationship between the light beam and the mirror.

FIG. 27 is an illustration showing the positional relationship between the light beam and the mirror 4 when the central axis of rotation 8 of the mirror 4 precesses to draw a conical locus. In the same figure, the same symbols as FIGS. 1 and 26 represent the same or identical portions.

The central axis of rotation 8 of the mirror 4 precesses so as to draw the conical locus of the apex angle of $2\phi$, with a point "0" on it as the apex. In order to emit the light beam generated at a light source or the light beam generator means 64 to the outside after changing its optical axis by 90°, the inclination angle of mirror 4 with respect to the central axis of rotation 8 is set at 45°. The maximum inclination angle of mirror 4 with the horizontal line when the central axis of rotation 8 oscillates is shown by a symbol $\gamma$, and the minimum inclination angle is shown by a symbol $\delta$. Since the casing 3 containing the light beam generator means 64 and the light beam receiver means 65 is attached to the inner ring member 14, the positional relationship of the light beam generator means 64 and the mirror 4 or of the relative position of the optical axis Ax and the mirror 4 does not change. Accordingly, if the central axis of rotation 8 precesses around the point "0" and the inclination of the mirror 4 changes in the range of the maximum angle $\delta$ and the minimum angle $\gamma$, the required minimum length of the mirror 4 is calculated by the following equation (2) independently of the inclination angle ($\gamma$ to $\delta$). The diameter of the light beam emitted from light beam generator means 64 is 2 r.

$$M = 2r/\cos 45° \quad (2)$$

On the other hand, the required size of the mirror 4 is as follows, if the casing 3 containing the light beam generator means 64 and light beam receiver means 65 is not attached to the inner ring member 14, but fixed onto, for instance, the upper surface of the moving vehicle 1.

Figure 28:
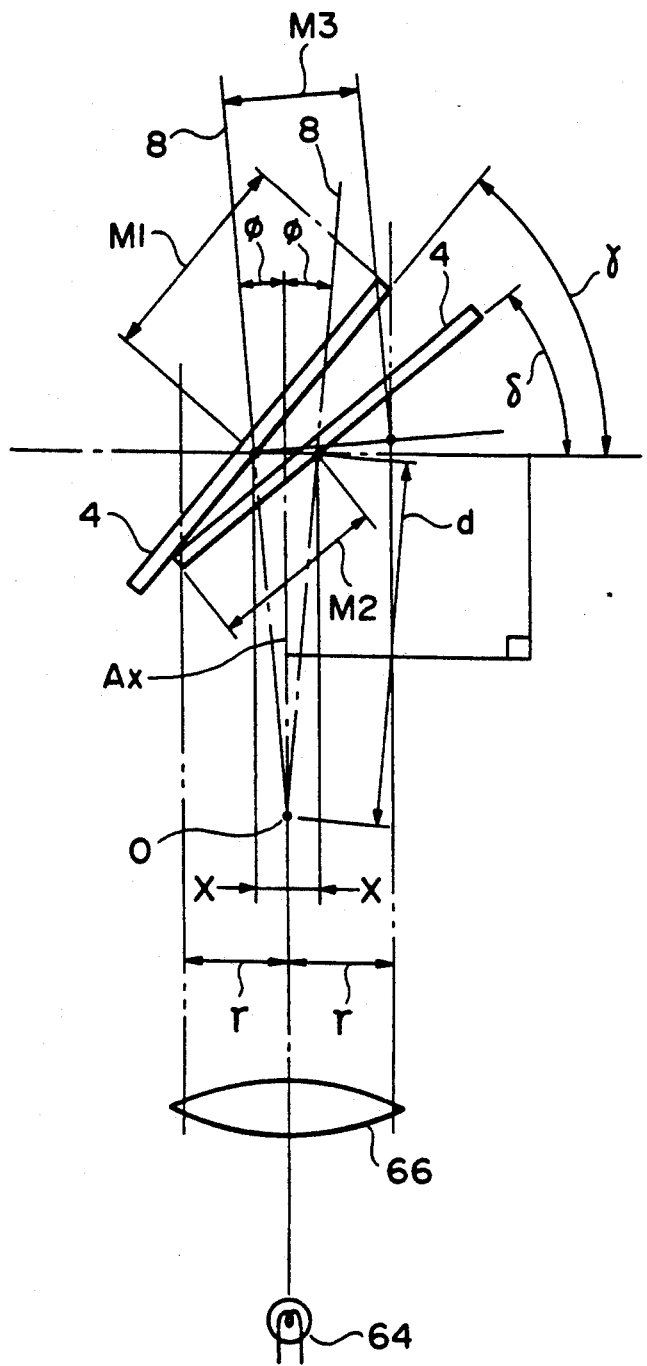

FIG. 28 is an illustration showing the relationship between the light beam and the mirror 4 when the light beam generator means 64 is fixed, and the same symbols as FIG. 27 represent the same or identical portions. If the mirror 4 inclines to the position at the maximum angle $\gamma$, the position of the mirror 4 shifts to the left with respect to the optical axis Ax of the light beam. On the other hand, if the mirror 4 inclines to the position at the minimum angle $\delta$, the position of the mirror 4 is shifted to the right with respect to the optical axis Ax of the light beam. In order that the light beam having a beam diameter of 2 r can be received in both cases, the length of the mirror 4 must be equal to or larger than the sum of M1 and M2.

The required minimum width of the mirror 4 is the size which can receive the light beam when the mirror 4 rotates 90° around the central axis of rotation 8 from the position as shown, with the mirror 4 being inclined to the position of the maximum angle $\gamma$, namely, two times the size shown by a symbol M3.

The lengths M1 to M3 can be calculated using the following equations. The distance from the center of inclination or precession 0 to the mirror 4 is designated by a symbol d, and the amplitude of the intersection point of the central axis of rotation 8 and the mirror 4 is represented by a symbol X.

$$\begin{aligned} M1 &= (X + r)/\cos\gamma \\ &= (d \cdot \sin\phi + r)/\cos(45° + \phi) \end{aligned} \quad (3)$$

$$\begin{aligned} M2 &= (X + r)/\cos\delta \\ &= (d \cdot \sin\phi + r)/\cos(45° - \phi) \end{aligned} \quad (4)$$

$$\begin{aligned} M3 &= (X + r)/\cos\phi \\ &= (d \cdot \sin\phi + r)/\cos\phi \end{aligned} \quad (5)$$

Figure 29:
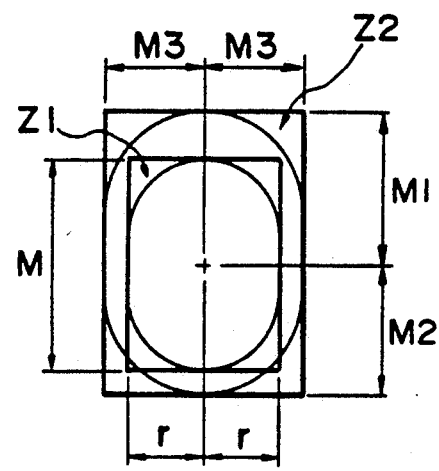
FIG. 29 is a representation showing the area ratio of the mirror due to difference in relative positions of the light beam and the mirror.

Referring to FIG. 29, the areas of mirror 4 calculated by the above-mentioned calculation equations (2) to (5) are compared for the respective configuration as shown in FIGS. 27 and 28. As shown in FIG. 29, the area of the mirror 4 required (rectangle Z1) when the light beam generator means is precessed integrally with the mirror 4, can substantially be reduced over the area of the mirror 4 required (rectangle Z2) when the light beam generator means is fixed.

As obvious from the above description, in accordance with the present invention, the rotational scanning of a light beam projected from a moving body can be performed at a high speed, and can be set so that a light beam can always be applied to the light reflectors vertically provided at positions spaced apart from the moving body so as to cross them. Therefore, even if the moving body itself continues to incline or vibrates, it is easy to apply the light beam to the light reflectors disposed at the reference points. As a result, the reference points are missed fewer times, and the position detection accuracy of the moving body based on the detection signals of the light reflected by the light reflectors increases, thereby making remarkable improvement in the guiding precision.

Even if a plurality of light reception signals are detected by a plurality of high speed rotational scannings in one cycle of precession scanning, the azimuths of optical signals detected in substantially the same direction can be represented by one data and stored. In consequence, the capacity of memory means for storing the azimuths can be saved, and the data processing is also facilitated.

In addition, since the position of the moving body is calculated for each one cycle of precession scanning on the basis of the stored azimuth data, enough time can be spent for calculating the moving body position even if the rotational scanning speed is fast.

Further, in accordance with the present invention, since the light beam generator means and receiver means are subjected to precession by driving means integral with the means for rotationally scanning light beams, the respective relative positions do not vary.

For this, in spite of the vertical vibrational scanning of light beams, no deviation occurs in the optical axis of the light beam for projection from the light beam generator means which is applied to the reflecting surface of a reflecting mirror, or in the optical axis of the reflected light from the light reflecting means to the light beam receiver means, and thus the portion of the scanner which rotates at a high speed can be made small-sized. Moreover, this leads to making the whole scanner small-sized which includes the motor for driving the reflecting mirror and the like, and also facilitates the weight distribution correction for providing a good balance in the high speed rotation.

By providing an arrangement in which a plurality of rotational scannings are performed in one precession cycle of the central axis of rotation, the light tracks are allowed to cross the light reflector means with a high probability during one precession cycle. As a result, the density of light tracks can be enhanced to apply light beams to the light reflector means with a high probability and frequency, without reducing the speed of the rotational scanning of light beams. Accordingly, the probability of receiving the light reflected by the light reflector means is remarkably increased, and hence the guiding accuracy of the moving body is also remarkably improved.

What is claimed is:

1. In a system for detecting the position of a moving body comprising light beam scanner means for rotatively scanning a light beam in a circular direction around the moving body, light beam receiver means mounted on said moving body for receiving said light beam reflected by optical retroreflector means disposed at at least three reference points spaced apart from said moving body, and means for detecting the azimuth of said optical retroreflector means, wherein the position of said moving body is detected on the basis of said detected azimuth and position information of the reference points, the system comprising
vibrating means for continuously vibrating said light beam vertically in periodic cycles, said light beam being rotatively scanned around said body a plurality of times during each vibration cycle of said light beam.

2. In a system for detecting the position of a moving body comprising light beam scanner means for rotatively scanning a light beam in a circular direction around the moving body, light beam receiver means mounted on said moving body for receiving said light beam reflected by optical retroreflector means disposed at at least three reference points spaced apart from said moving body, and means for detecting the azimuth of said optical retroreflector means, wherein the position of said moving body is detected on the basis of said detected azimuth and position information of the reference points, the system comprising vibrating means for vertically vibrating said light beam, the rotative scanning of said light beam being performed several times during one cycle of the vertical vibration of said light beam, said vibrating means being operative to rotate a central axis of rotation of said light beam scanner means while keeping it inclined by a predetermined angle so that the inclination direction varies continuously and periodically.

3. A system for detecting the position of a moving body as set forth in claim 2 wherein said central axis of rotation is rotated so that the locus drawn by said central axis is conical.

4. A system for detecting the positions of a moving body as set forth in claim 2 wherein said central axis of rotation is rotated so that the locus drawn by said central axis of rotation is circular conical.

5. A system for detecting the position of a moving body as set forth in claim 1 including means responsive to the azimuths of optical signals detected during each cycle of the vertical vibration of said light beam for specifying that when substantially the same azimuth has been detected a plurality of times during a given cycle, that azimuth is the azimuth of a predetermined retroreflector means.

6. In a system for detecting the position of a moving body comprising light beam scanner means for rotatively scanning a light beam in a circular direction around the moving body, light beam receiver means mounted on said moving body for receiving said light beam reflected by optical retroreflector means disposed at at least three reference points spaced apart from said moving body, and means for detecting the azimuth of said optical retroreflector means, wherein the position of said moving body is detected on the basis of said detected azimuth and position information of the reference points, the system comprising
vibrating means for vertically vibrating said light beam, the rotative scanning of said light beam being performed several times during one cycle of the vertical vibration of said light beam,
means for storing azimuths on a detection block basis, said storing means storing the azimuths of optical signals detected during one cycle of the vertical vibration of said light beam in such manner that a plurality of optical signals received from substantially the same azimuth are treated as the optical signals of a single detection block whose azimuths are represented by a single value, and
means for storing the number of light reception times on a detection block basis, wherein
a plurality of detection blocks equal in number to the number of disposed retroreflector means are picked out in descending order of the number of light reception times in each block, and the stored azimuth representative of the particular detection block is determined to be the azimuth of said retroreflective means.

7. A system for detecting the position of a moving body comprising light beam generator means mounted on the moving body, means for rotatively scanning a light beam from said beam generator in a circular direction around said moving body, light beam receiver means mounted on said moving body for receiving said light beam after it has been reflected by optical retroreflector means disposed at positions spaced apart from said moving body, and means for detecting the position of said moving body on the basis of position information of said retroreflector means and information derived from reception of said reflected light beam, the system including means for increasing the probability that said rotatively scanned light beam will be incident on said retroreflector means during movement of said moving body, comprising:

precession means for precessing the central axis of rotation of said means for rotatively scanning a light beam so as to draw a substantially conical locus, said light beam generator means and receiver means being precessed by said precession means continuously during operation of said rotative scanning means, whereby said light beam is vertically vibrated in a periodic cyclical fashion during the rotative scanning of said light beam.

8. A system for detecting the position of a moving body as set forth in claim 7 wherein said means for rotatively scanning a light beam comprises a reflecting mirror for bending the optical axis of the light beam from said light beam generator means, a driving motor for rotating said reflecting mirror around the optical axis of the light beam between said light beam generator means and said reflecting mirror, and a precession body which is precessed by said precession means, said means for rotatively scanning a light beam, said light beam generator means and said light receiver means each being attached to said precession body, the precession body being so driven that the rotating axis of said reflecting mirror draws a conical locus.

9. A system for detecting the position of a moving body as set forth in claim 8 wherein said precession body has said light beam generator means and said light receiver means provided at one side thereof and has said means for rotatively scanning a light beam provided at a different side thereof.

10. A system for detecting the position of a moving body as set forth in claim 7 wherein said light beam is rotatively scanned several times during one vertical oscillation cycle of said light beam.

11. A system for detecting the position of a moving body comprising light beam scanning means operative to rotatively scan the light beam substantially in a horizontal plane around the moving body, light beam receiver means mounted on said moving body for receiving said light beam reflected by optical retroreflector means disposed at positions spaced apart from said moving body, and means for detecting a positional relationship between said moving body and said retroreflector means on the basis of a light reception signal, wherein the position of said moving body is detected on the basis of said detection result, the system comprising:

light beam vibration means for vertically vibrating said light beam, means for performing a plurality of rotative scannings of said light beam during one vertical vibration cycle of said light beam, memory means for storing the azimuths of the light reception signal during one cycle of vertical vibration of said light beam, predicted azimuth deciding means for predicting an azimuth in which the light beam reflected by said retroreflector means is to be detected in the next vibration scan, on the basis of the azimuth or azimuths detected up to the present, and means for collating each said stored azimuth with said predicted azimuth for each said vibration scan cycle to determine the actual light reception azimuth, and the position of the moving body being detected on the basis of the collation result.

12. A system for detecting the position of a moving body as set forth in claim 11 wherein when a plurality of optical signals are received in substantially the same azimuth during one virtical vibration cycle of said light beam, only the azimuth of the latest light reception signal is stored.

13. A system for detecting the position of a moving body as set forth in claim 11 wherein said light beam vibration means rotates the central axis of rotation of said light beam scanning means around one point thereof, with the central axis of rotation of said light beam scanning means being inclined with predetermined angle to draw a conical surface.

* * * * *